(12) United States Patent
Cahill et al.

(10) Patent No.: US 7,162,102 B2
(45) Date of Patent: Jan. 9, 2007

(54) METHOD AND SYSTEM FOR COMPOSITING IMAGES TO PRODUCE A CROPPED IMAGE

(75) Inventors: Nathan D. Cahill, West Henrietta, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 610 days.

(21) Appl. No.: 10/025,357

(22) Filed: Dec. 19, 2001

(65) Prior Publication Data

US 2003/0113035 A1 Jun. 19, 2003

(51) Int. Cl.
*G06K 9/36* (2006.01)
(52) U.S. Cl. .................... 382/288; 382/284
(58) Field of Classification Search ............... 382/284, 382/153, 294, 167, 159, 288; 348/441–459, 348/556; 396/436
See application file for complete search history.

(56) References Cited

U.S. PATENT DOCUMENTS

| | | | | |
|---|---|---|---|---|
| 4,150,360 | A | * | 4/1979 | Kopp et al. .................. 382/133 |
| 4,812,903 | A | * | 3/1989 | Wagensonner et al. ..... 358/521 |
| 5,138,460 | A | | 8/1992 | Egawa |
| 5,649,032 | A | * | 7/1997 | Burt et al. .................... 382/284 |
| 6,094,218 | A | * | 7/2000 | Suzuki et al. ................. 348/96 |
| 6,097,854 | A | | 8/2000 | Szeliski et al. |
| 6,243,103 | B1 | | 6/2001 | Takiguchi et al. |
| 6,266,128 | B1 | * | 7/2001 | Yoshida et al. ............... 355/40 |
| 6,282,317 | B1 | | 8/2001 | Luo et al. |
| 6,549,681 | B1 | * | 4/2003 | Takahashi et al. .......... 382/294 |
| 6,580,457 | B1 | * | 6/2003 | Armstrong et al. ......... 348/317 |
| 6,744,931 | B1 | * | 6/2004 | Komiya et al. ............. 382/284 |
| 2003/0040971 | A1 | * | 2/2003 | Freedenberg et al. ......... 705/26 |
| 2004/0071367 | A1 | * | 4/2004 | Irani et al. ................... 382/284 |

OTHER PUBLICATIONS

Seitz et al., View Morphing, 1996, ACM Press, Proceedings of the 23rd annual conference on Computer graphics and interactive techniques, pp. 21-30.*
Seitz et al., View Morphing, SIGGRAPH '96, *Computer Graphics*, pp. 21-30.
Kuglin et al., The Phase Correlation Image Alignment Method, *Proc. '75 International Conference on Cybernetics and Society*, 1975, pp. 163-165.
Textbook: Gonzalez, et al., Digital Image Processing, Addison-Wesley, 1992.
Zhang et al., A Robust Technique for Matching Two Uncalibrated Images Through the Recovery of the Unknown Epipolar Geometry, INRIA Report No. 2273, May 1994, pp. 1-38.
Textbook: A. K. Jain, Fundamentals of Digital Image Processing, Prentice Hall, 1989, Chapter 4, pp. 80-131.

(Continued)

*Primary Examiner*—Daniel Miriam
*Assistant Examiner*—Dennis Rosario
(74) *Attorney, Agent, or Firm*—Thomas H. Close

(57) ABSTRACT

A method for producing a cropped digital image, includes the steps of: providing a plurality of partially overlapping source digital images; providing a cropping aspect ratio L:H, the cropping aspect ratio being the ratio of the length to the height of the cropped digital image; providing a cropping criterion, the cropping criterion being a criterion for the size and location of the cropped digital image; combining the source digital images to form a composite digital image; selecting the cropping region of the composite digital image according to the cropping criterion, said cropping region being a rectangular region having aspect ratio L:H, and having size and location determined by the cropping criterion; and, cropping the composite digital image to the cropping region to form a cropped digital image.

25 Claims, 10 Drawing Sheets

OTHER PUBLICATIONS

Stokes et al., A Standard Default Color Space for the Internet-sRGB, http://www.color.org/sRGB.html, pp. 1-12.

Internet reference: Extended Reference Input Medium Metric (ERIMM), PIMA standard #7466, http://www.pima.net/standards/it10/IT10_POW.htm.

Beier et al., Feature-Based Image Metamorphosis, SIGGRAPH '92, *Computer Graphics,* vol. 26, No. 2, Jul. 1992, pp. 35-42.

Internet reference: Canon PowerShot, http://www.powershot.com/powersnot2/a20_a10/press.html, pp. 1-3.

Shum et al., Systems and Experiment Paper: Construction of Panoramic Image Mosaics with Global and Local Alignment, IJCV 36(2), 2000, pp. 101-130.

USSN: _, filed Nov. 5, 2001 by Cahill et al.

U.S. Appl. No. 09/224,547, filed Dec. 31, 1998 by May et al.

* cited by examiner

METHOD AND SYSTEM FOR COMPOSITING IMAGES TO PRODUCE A CROPPED IMAGE

FIELD OF THE INVENTION

The invention relates generally to the field of digital image processing, and in particular to a technique for compositing multiple images into a large field of view image, said image being cropped to a selected aspect ratio.

BACKGROUND OF THE INVENTION

Conventional systems for generating images comprising a large field of view of a scene from a plurality of images generally have two steps: (1) an image capture step, where the plurality of images of a scene are captured with overlapping pixel regions; and (2) an image combining step, where the captured images are digitally processed and blended to form a composite digital image.

In some of these systems, images are captured about a common rear nodal point. For example, in U.S. Ser. No. 09/224,547, filed Dec. 31, 1998 by May et. al., overlapping images are captured by a digital camera that rotates on a tripod, thus ensuring that each image is captured with the same rear nodal point lying on the axis of rotation of the tripod.

In other systems, the capture constraint is weakened so that the images can be captured from substantially similar viewpoints. One example of a weakly-constrained system is the image mosaic construction system described in U.S. Pat. No. 6,097,854 by Szeliski et al., issued Aug. 1, 2000; also described in Shum et al., "Systems and Experiment Paper: Construction of Panoramic Image Mosaics with Global and Local Alignment," IJCV 36(2), pp. 101–130, 2000. Another example is the "stitch assist" mode in the Canon PowerShot series of digital cameras (see http://www.powershot.com/powershot2/a20_a10/press.html; U.S. Pat. No. 6,243,103 issued Jun. 5, 2001 to Takiguchi et al.; and U.S. Pat. No. 5,138,460 issued Aug. 11, 1992 to Egawa.

In some systems, the capture constraint is removed altogether, and the images are captured at a variety of different locations. For example, the view morphing technique described in Seitz and Dyer, "View Morphing," SIGGRAPH '96, in *Computer Graphics*, pp. 21–30, 1996, is capable of generating a composite image from two images of an object captured from different locations.

The digital processing required in the image combining step depends on the camera locations of the captured images. When the rear nodal point is exactly the same, the image combining step comprises three stages: (1) a warping stage, where the images are geometrically warped onto a cylinder, sphere, or any geometric surface suitable for viewing; (2) an image alignment stage, where the warped images are aligned by a process such as phase correlation (Kuglin, et al., "The Phase Correlation Image Alignment Method," *Proc. 1975 International Conference on Cybernetics and Society,* 1975, pp. 163–165), or cross correlation (textbook: Gonzalez, et al., *Digital Image Processing*, Addison-Wesley, 1992); and (3) a blending stage, where the aligned warped images are blended together to form the composite image. The blending stage can use a simple feathering technique that uses a weighted average of the images in the overlap regions, and it can utilize a linear exposure transform (as described in U.S. Ser. No. 10/008,026, filed Nov. 5, 2001 by Cahill et al., to align the exposure values of overlapping images. In addition, a radial exposure transform (as described in U.S. Ser. No. 10/023,137, filed Dec. 17, 201 by Cahill et al., can be used in the blending stage to compensate for light falloff.

In weakly-constrained systems, the image combining step generally comprises two stages: (1) an image alignment stage, where the images are locally and/or globally aligned according to some model (such as a translational, rotational, affine, or projective model); and (2) a blending stage, where the aligned images are blended together to form a texture map or composite image. The blending stage typically incorporates a de-ghosting technique that locally warps images to minimize "ghost" images, or areas in the overlapping regions where objects are slightly misaligned due to motion parallax. The local warping used by the de-ghosting technique can also be incorporated in the model of the image alignment stage. For an example of image combining with such a system, see the aforementioned Shum and Szeliski references.

In systems where the capture constraint is removed altogether, the image combining step first requires that the epipolar geometry of the captured images be estimated (for a description of estimating epipolar geometry, see Zhang, et al., "A Robust Technique for Matching Two Uncalibrated Images Through the Recovery of the Unknown Epipolar Geometry," INRIA Report No. 2273, May 1994, pp. 1–38). Once the epipolar geometry has been estimated, the images are projected to simulate capture onto parallel image planes. The projected images are then morphed by a standard image morphing procedure (see Beier et al., "Feature-Based Image Metamorphosis," SIGGRAPH '92 *Computer Graphics*, Vol. 26, No. 2, July 1992, pp. 35–42), and the morphed image is reprojected to a chosen view point to form the composite image. An example of such a system is described in the aforementioned Seitz and Dyer reference.

In all of the prior art methods and systems for generating large field of view images, the composite image is provided as output. In some instances, however, it might be necessary to provide a composite image that has been cropped and/or zoomed to a selected aspect ratio and size. For example, consider a digital photofinishing system that prints hardcopies of images that have been digitized from film after being captured by an Advanced Photo System (APS) camera. APS cameras provide the photographer the choice of receiving prints in three different formats: HDTV (H), Classic (C), or Panoramic (P). The Classic format corresponds to a 3:2 aspect ratio, the HDTV format to a 16:9 aspect ratio, and the Panoramic format to a 3:1 aspect ratio. If the photographer captures a sequence of images with an APS camera and uses one of the known techniques to generate a composite image, the composite image will likely not have an aspect ratio corresponding to the H, C, or P formats. Since one of these three formats would be required in the digital photofinishing system, the photographer must manually intervene and crop the composite image to the appropriate aspect ratio for printing.

There is a need therefore for an improved method that will combine images into a composite image; the method being capable of automatically cropping the composite image to a desired aspect ratio.

SUMMARY OF THE INVENTION

The need is met according to the present invention by providing a method for producing a cropped digital image that includes the steps of: providing a plurality of partially overlapping source digital images; providing a cropping aspect ratio L:H, the cropping aspect ratio being the ratio of the length to the height of the cropped digital image;

providing a cropping criterion, the cropping criterion being a criterion for the size and location of the cropped digital image; combining the source digital images to form a composite digital image; selecting the cropping region of the composite digital image according to the cropping criterion, said cropping region being a rectangular region having aspect ratio L:H, and having size and location determined by the cropping criterion; and, cropping the composite digital image to the cropping region to form a cropped digital image.

ADVANTAGES

The present invention has the advantage of automatically producing a cropped digital image in a system for compositing a plurality of source digital images. This eliminates the need for the user to crop and/or resize the composite digital image.

DETAILED DESCRIPTION OF THE INVENTION

The present invention will be described as implemented in a programmed digital computer. It will be understood that a person of ordinary skill in the art of digital image processing and software programming will be able to program a computer to practice the invention from the description given below. The present invention may be embodied in a computer program product having a computer readable storage medium such as a magnetic or optical storage medium bearing machine readable computer code. Alternatively, it will be understood that the present invention may be implemented in hardware or firmware.

Figure 1:
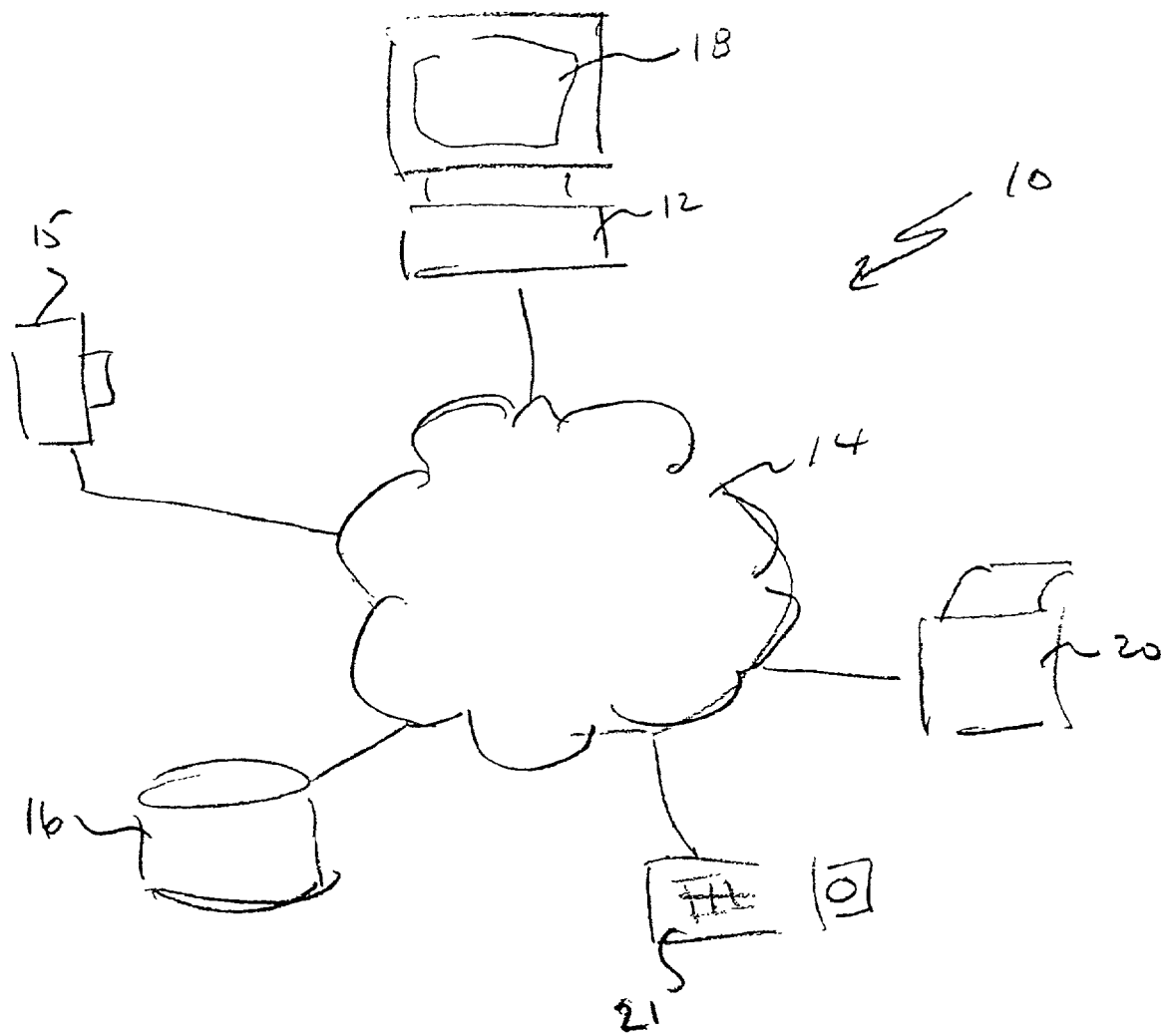
FIG. 1 is a block diagram illustrating a digital image processing system suitable for practicing the present invention.

Referring first to FIG. 1, a digital image processing system useful for practicing the present invention is shown. The system generally designated 10, includes a digital image processing computer 12 connected to a network 14. The digital image processing computer 12 can be, for example, a Sun Sparcstation, and the network 14 can be, for example, a local area network with sufficient capacity to handle large digital images. The system includes an image capture device 15, such as a high resolution digital camera, or a conventional film camera and a film digitizer, for supplying digital images to network 14. A digital image store 16, such as a magnetic or optical multi-disk memory, connected to network 14 is provided for storing the digital images to be processed by computer 12 according to the present invention. The system 10 also includes one or more display devices, such as a high resolution color monitor 18, or hard copy output printer 20 such as a thermal or inkjet printer. An operator input, such as a keyboard and track ball 21, may be provided on the system.

Figure 2:
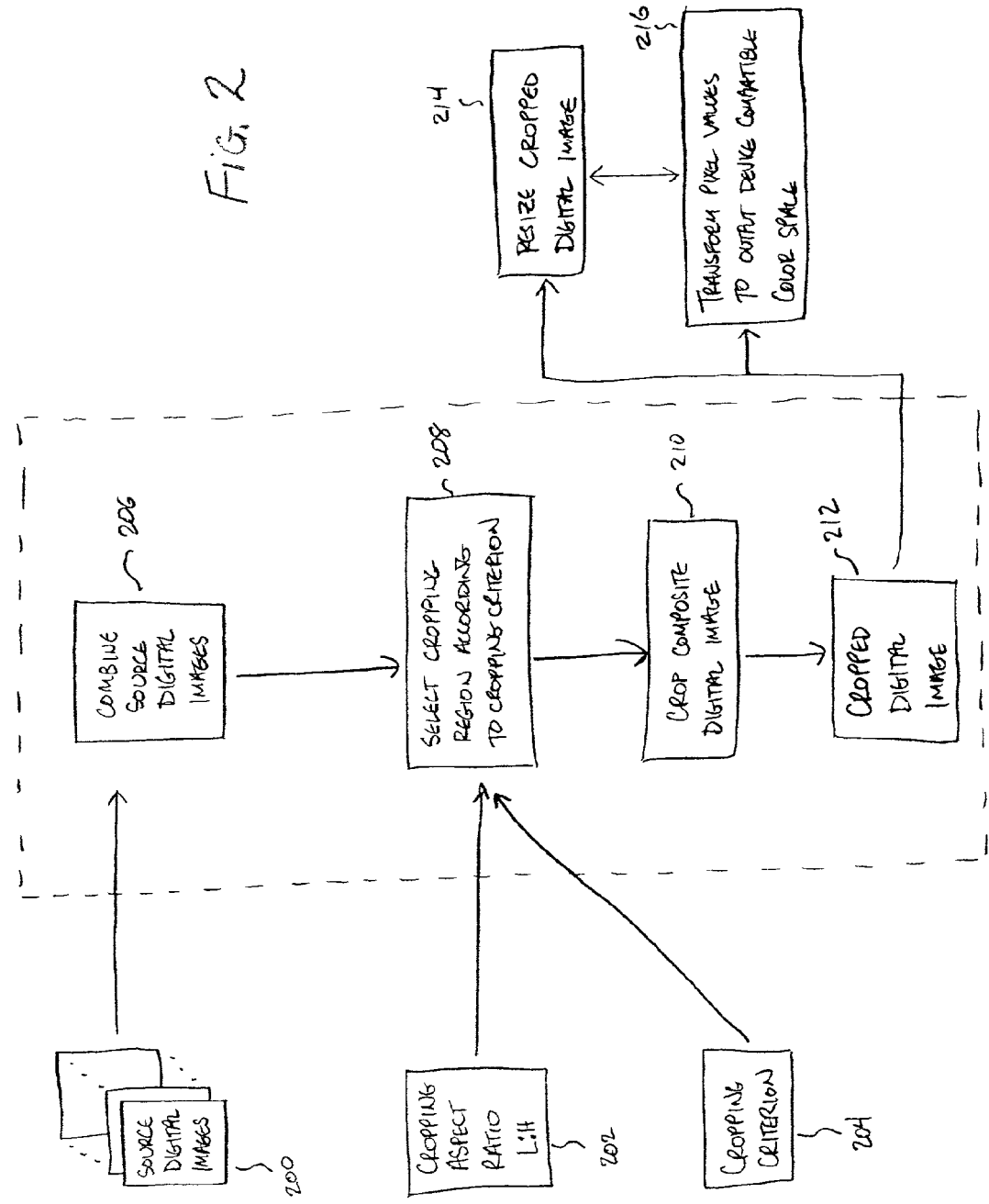
FIG. 2 illustrates in block diagram form, the method of forming a cropped digital image from at least two source digital images.

Referring next to FIG. 2, at least two source digital images are provided 200 in the method of the present invention. The source digital images can be provided by a variety of means; for example, they can be captured from a digital camera, extracted from frames of a video sequence, scanned from photographic film or hardcopy output, or generated by any other means. A cropping aspect ratio L:H is also provided 202. The cropping aspect ratio is the ratio of the length (distance of the horizontal edge) to the height (distance of the vertical edge) of the desired cropped digital image. For example, in a digital photofinishing system that prints hardcopies of images that have been digitized from film after being captured by an Advanced Photo System (APS) camera, the cropping aspect ratio is constrained to be either 16:9, 3:2, or 3:1, corresponding to HDTV, Classic, and Panoramic formats, respectively.

A cropping criterion is also provided 204. The cropping criterion specifies the size and location of the cropped digital image. In the preferred embodiment, the cropping criterion states that the cropped digital image be the composite digital image region having the largest area out of the set of all regions having aspect ratio L:H. In an alternative embodiment, the cropping criterion is that the cropped digital image be the composite digital image region having the largest area out of the set of all regions having aspect ratio L:H and having centers at the centroid of the composite digital image. In yet another alternative embodiment, the cropping criterion is that the cropped digital image be the composite digital image region having the largest area out of the set of all regions having aspect ratio L:H and having centers at the centroid of the main subject of the composite digital image.

The source digital images are then combined 206 by a scheme known in the art for combining images captured from the same nodal point, similar nodal points, or different nodal points, to form a composite digital image. In step 208, a cropping region is selected, the cropping region being a composite digital image region having aspect ratio L:H provided in step 202, selected according to the cropping criterion provided in step 204. Once the cropping region has been selected 208, the composite digital image is cropped 210 to the cropping region, yielding the cropped digital image 212.

In one embodiment, the current invention further comprises the step of resizing 214 the cropped digital image. For example, consider the digital photofinishing system that prints hardcopies of images that have been digitized from film at an aspect ratio of 3:2, and requires the spatial resolution of images to be 6000 pixels by 4000 pixels. If four digital images are provided to the method of FIG. 2, each digital image having a spatial resolution of 6000 pixels by 4000 pixels, the cropped digital image may have spatial resolution 9000 pixels by 6000 pixels. In order to render a hardcopy print of the cropped digital image through the digital photofinishing system, the cropped digital image is resized to have spatial resolution 6000 pixels by 4000 pixels. The resizing step can be performed by any technique known in the art; for example, bilinear interpolation, bicubic interpolation, spline interpolation, or any of a variety of other image resizing techniques (see textbook: A. K. Jain, "Fundamentals of Digital Image Processing," Prentice Hall, 1989, Chapter 4, pp. 80–131, for a discourse on image sampling and resizing).

In another embodiment, the current invention further comprises the step of transforming 216 the pixel values of the cropped digital image to an output device compatible color space. The output device compatible color space can be chosen for any of a variety of output scenarios; for example, video display, photographic print, inkjet print, or any other output device.

Figure 3:
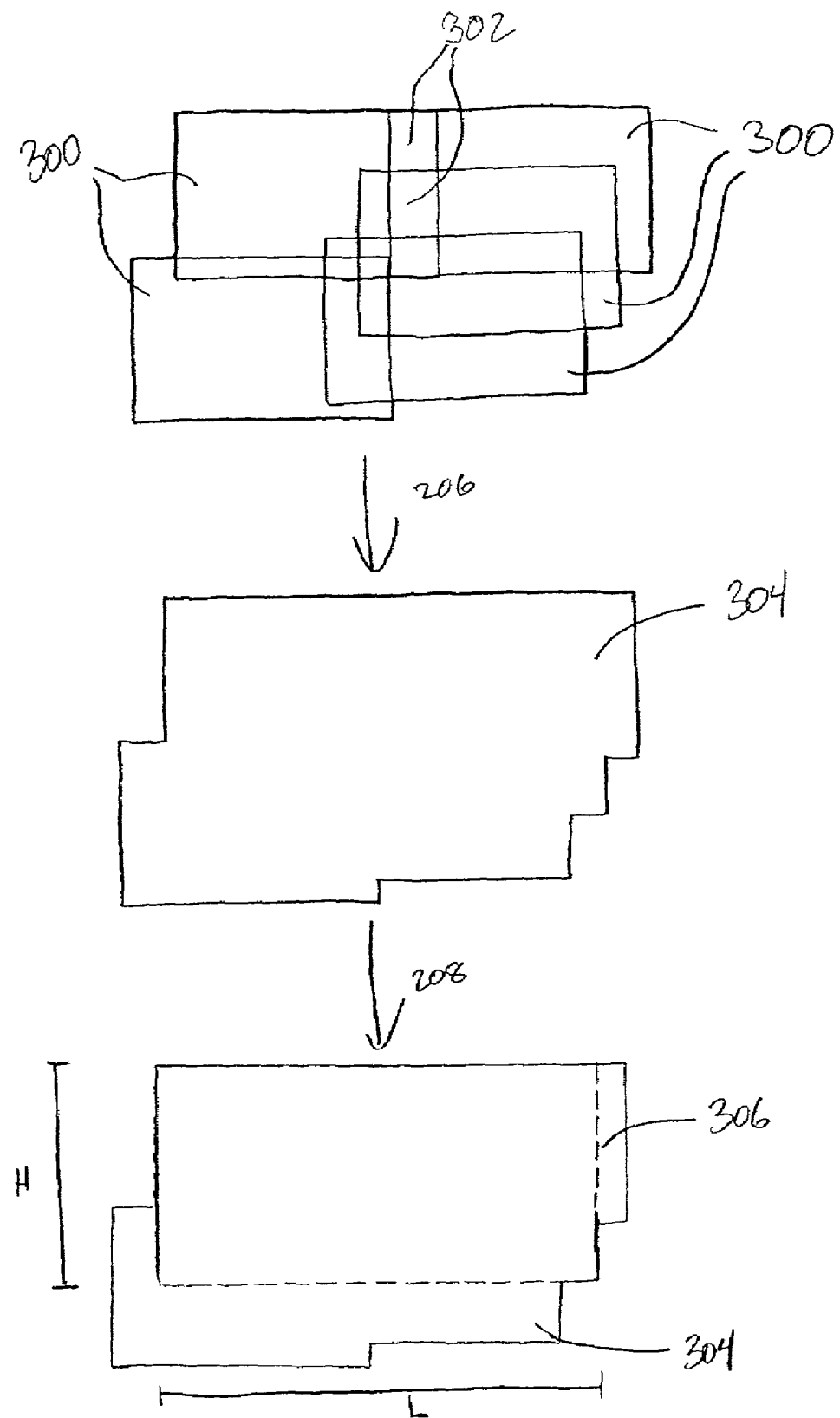
FIG. 3 illustrates the preferred cropping criterion.

Referring next to FIG. 3, the preferred cropping criterion is illustrated. The source digital images 300 overlap in overlapping pixel regions 302. In step 206, the source digital images are combined to form the composite digital image 304. The cropping region 306 is then selected in step 208 according to the cropping criterion 204. In the preferred embodiment, the cropping region 306 has the largest area of all composite digital image regions having aspect ratio L:H. In some instances, there can be more than one distinct composite digital image region having aspect ratio L:H and having maximum area, yielding multiple candidate regions for the cropping regions. In such instances, there may be a small (e.g. less than 10) or very large (e.g. more than 10) set of candidate regions. Furthermore, in instances where there is a very large set of candidate regions, the centroids of the candidate regions may form one or more path segments.

If only one candidate region exists, it is chosen as the cropping region. If a small number of candidate regions exist, the cropping region is chosen randomly from the small set of candidate regions. If a very large number of candidate regions exist, and the centroids of those candidate regions form a single path segment, the cropping region is chosen to be the candidate region whose center corresponds to the center of the path segment. If a very large number of candidate regions exist, and the centroids of those candidate regions form more than one distinct path segment, one path segment is chosen at random, and the cropping region is chosen to be the candidate region whose center corresponds to the center of that path segment.

Figure 4:
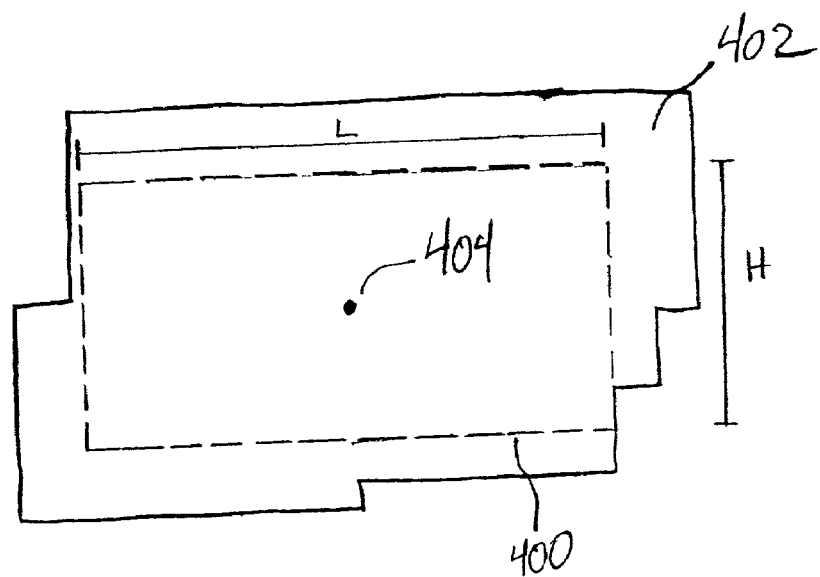
FIG. 4 illustrates an alternative cropping criterion.

Referring next to FIG. 4, another embodiment of the cropping criterion is illustrated. The cropping region 400 of the composite digital image 402 is the region having the largest area of all composite digital image regions having aspect ratio L:H, and having a center at the centroid 404 of the composite digital image 402.

Figure 5:
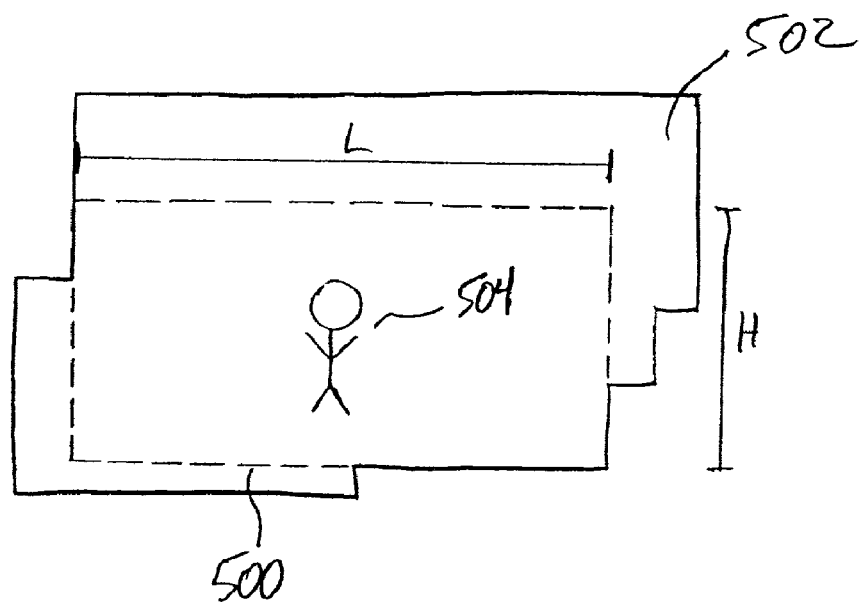
FIG. 5 illustrates a further alternative cropping criterion.

Referring next to FIG. 5, another embodiment of the cropping criterion is illustrated. The cropping region 500 of the composite digital image 502 is the region having the largest area of all composite digital image regions having aspect ratio L:H, and having a center at a main subject 504 of the composite digital image 502. The main subject 504 of the composite digital image 502 can be indicated manually, or determined automatically by techniques known in the art; see U.S. Pat. No. 6,282,317 issued Aug. 28, 2001 to Luo et al., for an example of automatic main subject detection, which is incorporated herein by reference.

"It is an object of this invention to provide a method for detecting the location of main subjects within a digitally captured image and thereby overcoming one or more problems set forth above.

"It is also an object of this invention to provide a measure of belief for the location of main subjects within a digitally captured image and thereby capturing the intrinsic degree of uncertainty in determining the relative importance of different subjects in an image. The output of the algorithm is in the form of a list of segmented regions ranked in a descending order of their likelihood as potential main subjects for a generic or specific application. Furthermore, this list can be converted into a map in which the brightness of a region is proportional to the main subject belief of the region.

"It is also an object of this invention to use ground truth data. Ground truth, defined as human outlined main subjects, is used to feature selection and training the reasoning engine.

"It is also an object of this invention to provide a method of finding main subjects in an image in an automatic manner.

"It is also an object of this invention to provide a method of finding main subjects in an image with no constraints or assumptions on scene contents.

"It is further an object of the invention to use the main subject location and main subject belief to obtain estimates of the scene characteristics.

"The present invention comprises the steps of:

"a) receiving a digital image;

"b) extracting regions of arbitrary shape and size defined by actual objects from the digital image;

"c) grouping the regions into larger segments corresponding to physically coherent objects, "d) extracting for each of the regions at least one structural saliency feature and at least one semantic saliency feature; and, "e) integrating saliency features using a probabilistic reasoning engine into an estimate of a belief that each region is the main subject.

"The above and other objects of the present invention will become more apparent when taken in conjunction with the following description and drawings wherein identical reference numerals have been used, where possible, to designate identical elements that are common to the figures." (quoting the Summary of the Invention)

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor based unit 20 for receiving and processing software programs and for performing other processing functions. A touch screen display 30 is electrically connected to the microprocessor based unit 20 for displaying user related information associated with the software, and for receiving user input via touching the screen. A keyboard 40 is also connected to the microprocessor based unit 20 for permitting a user to input information to the software. As an alternative to using the keyboard 40 for input, a mouse SO may be used for moving a selector 52 on the display 30 and for selecting an item on which the selector 52 overlays, as is well known in the art.

A compact disk-read only memory (CD-ROM) 55 is connected to the microprocessor based unit 20 for receiving software programs and for providing a means of inputting the software programs and other information to the microprocessor based unit 20 via a compact disk 57, which typically includes a software program. In addition, a floppy disk 61 may also include a software program, and is inserted into the microprocessor based unit 20 for inputting the software program. Still further, the microprocessor based unit 20 may be programmed, as is well know in the art, for storing the software program internally. A printer 56 is connected to the microprocessor based unit 20 for printing a hardcopy of the output of the computer system 10.

Images may also be displayed on the display 30 via a personal computer card (PC card) 62 or, as it was formerly known, a personal computer memory card international association card (PCMCIA card) which contains digitized images electronically embodied the card 62. The PC card 62 is ultimately inserted into the microprocessor based unit 20 for permitting visual display of the image on the display 30.

Referring to FIG. 2, there is shown a block diagram of an overview of the present invention. First, an input image of a natural scene is acquired and stored S0 in a digital form. Then, the image is segmented S2 into a few regions of homogeneous properties. Next, the region segments are grouped into larger regions based on similarity measures S4 through non-purposive perceptual grouping, and further grouped into larger regions corresponding to perceptually coherent objects S6 through purposive grouping (purposive grouping concerns specific objects). The regions are evaluated for their saliency S8 using two independent yet complementary types of saliency features—structural saliency features and semantic saliency features. The structural saliency features, including a set of low-level early vision features and a set of geometric features, are extracted S8a, which are further processed to generate a set of self-saliency features and a set of relative saliency features. Semantic saliency features in the forms of key subject matters, which are likely to be part of either foreground (for example, people) or background (for example, sky, grass), are detected 58b to provide semantic cues as well as scene context cues. The evidences of both types are integrated S10 using a reasoning engine based on a Bayes net to yield the final belief map of the main subject S12.

To the end of semantic interpretation of images, a single criterion is clearly insufficient. The human brain, furnished with its a priori knowledge and enormous memory of real world subjects and scenarios, combines different subjective criteria in order to give an assessment of the interesting or primary subject (s) in a scene. The following extensive list of features are believed to have influences on the human brain in performing such a somewhat intangible task as main subject detection: location, size, brightness, colorfulness, texturefulness, key subject matter, shape, symmetry, spatial relationship (surroundedness/occlusion), borderness, indoor/outdoor, orientation, depth (when applicable), and motion (when applicable for video sequence).

In the present invention, the low-level early vision features include color, brightness, and texture. The geometric features include location (centrality), spatial relationship (borderness, adjacency, surroundedness, and occlusion), size, shape, and symmetry. The semantic features include flesh, face, sky, grass, and other green vegetation. Those skilled in the art can define more features without departing from the scope of the present invention.

S2: Region Segmentation

The adaptive Bayesian color segmentation algorithm (Luo et al., "*Towards physics-based segmentation of photographic color images,*" *Proceedings of the IEEE International Conference on Image Processing,* 1997) is used to generate a tractable number of physically coherent regions of arbitrary shape. Although this segmentation method is preferred, it will be appreciated that a person of ordinary skill in the art can use a different segmentation method to obtain object regions of arbitrary shape without departing from the scope of the present invention. Segmentation of arbitrarily shaped regions provides the advantages of (1) accurate measure of the size, shape, location of and spatial relationship among objects; (2) accurate measure of the color and texture of objects; and (3) accurate classification of key subject matters.

Referring to FIG. 8, there is shown a block diagram of the preferred segmentation algorithm. First, an initial segmentation of the image into regions is obtained S50. A color histogram of the image is computed and then partitioned into a plurality of clusters that correspond to distinctive, prominent colors in the image. Each pixel of the image is classified to the closest cluster in the color space according to a preferred physics-based color distance metric with respect to the mean values of the color clusters (Luo et al., "*Towards physics-based segmentation of photographic color images,*" *Proceedings of the IEEE International Conference on Image Processing,* 1997). This classification process results in an initial segmentation of the image. A neighborhood window is placed at each pixel in order to determine what neighborhood pixels are used to compute the local color histogram for this pixel. The window size is initially set at the size of the entire image S52, so that the local color histogram is the same as the one for the entire image and does not need to be recomputed. Next, an iterative procedure is performed between two alternating processes: re-computing S54 the local mean values of each color class based on the current segmentation, and re-classifying the pixels according to the updated local mean values of color classes S56. This iterative procedure is performed until a convergence is reached S60. During this iterative procedure, the strength of the spatial constraints can be adjusted in a gradual manner S58 (for example, the value of $\beta$, which indicates the strength of the spatial constraints, is increased linearly with each iteration). After the convergence is reached for a particular window size, the window used to estimate the local mean values for color classes is reduced by half in size S62. The iterative procedure is repeated for the reduced window size to allow more accurate estimation of the local mean values for color classes. This mechanism introduces spatial adaptivity into the segmentation process. Finally, segmentation of the image is obtained when the iterative procedure reaches convergence for the minimum window size S64.

S4 & S6: Perceptual Grouping

The segmented regions may be grouped into larger segments that consist of regions that belong to the same object. Perceptual grouping can be non-purposive and purposive. Referring to FIG. 2, non-purposive perceptual grouping 84 can eliminate over-segmentation due to large illumination differences, for example, a table or wall with remarkable illumination falloff over a distance. Purposive perceptual grouping S6 is generally based on smooth, noncoincidental connection of joints between parts of the same object, and in certain cases models of typical objects (for example, a person has head, torso and limbs).

Perceptual grouping facilitates the recognition of high-level vision features. Without proper perceptual grouping, it is difficult to perform object recognition and proper assessment of such properties as size and shape. Perceptual grouping includes: merging small regions into large regions based on similarity in properties and compactness of the would-be merged region (non-purposive grouping); and grouping parts that belong to the same object based on commonly shared background, compactness of the would-be merged region, smoothness in contour connection between regions, and model of specific object (purposive grouping).

S8: Feature Extraction

For each region, an extensive set of features, which are shown to contribute to visual attention, are extracted and associated evidences are then computed. The list of features consists of three categories—low-level vision features, geometric features, and semantic features. For each feature, either or both of a self-saliency feature and a relative saliency feature are computed. The self-saliency is used to capture subjects that stand out by themselves (for example, in color, texture, location and the like), while the relative saliency is used to capture subjects that are in high contrast to their surrounding (for example, shape). Furthermore, raw measurements of features, self-salient or relatively salient, are converted into evidences, whose values are normalized to be within [0, 1.0], by belief sensor functions with appropriate nonlinearity characteristics. Referring to FIG. 3, there is shown a sigmoid-shaped belief sensor function used in the present invention. A raw feature measurement that has a value between a minimum value and a maximum value is mapped to a belief value within [0, 1]. A Gaussian-shaped belief sensor function (not shown) is also used for some features, as will be described hereinbelow.

Structural Saliency Features

Structural saliency features include individually or in combination self saliency features and relative saliency features.

Figure 6:
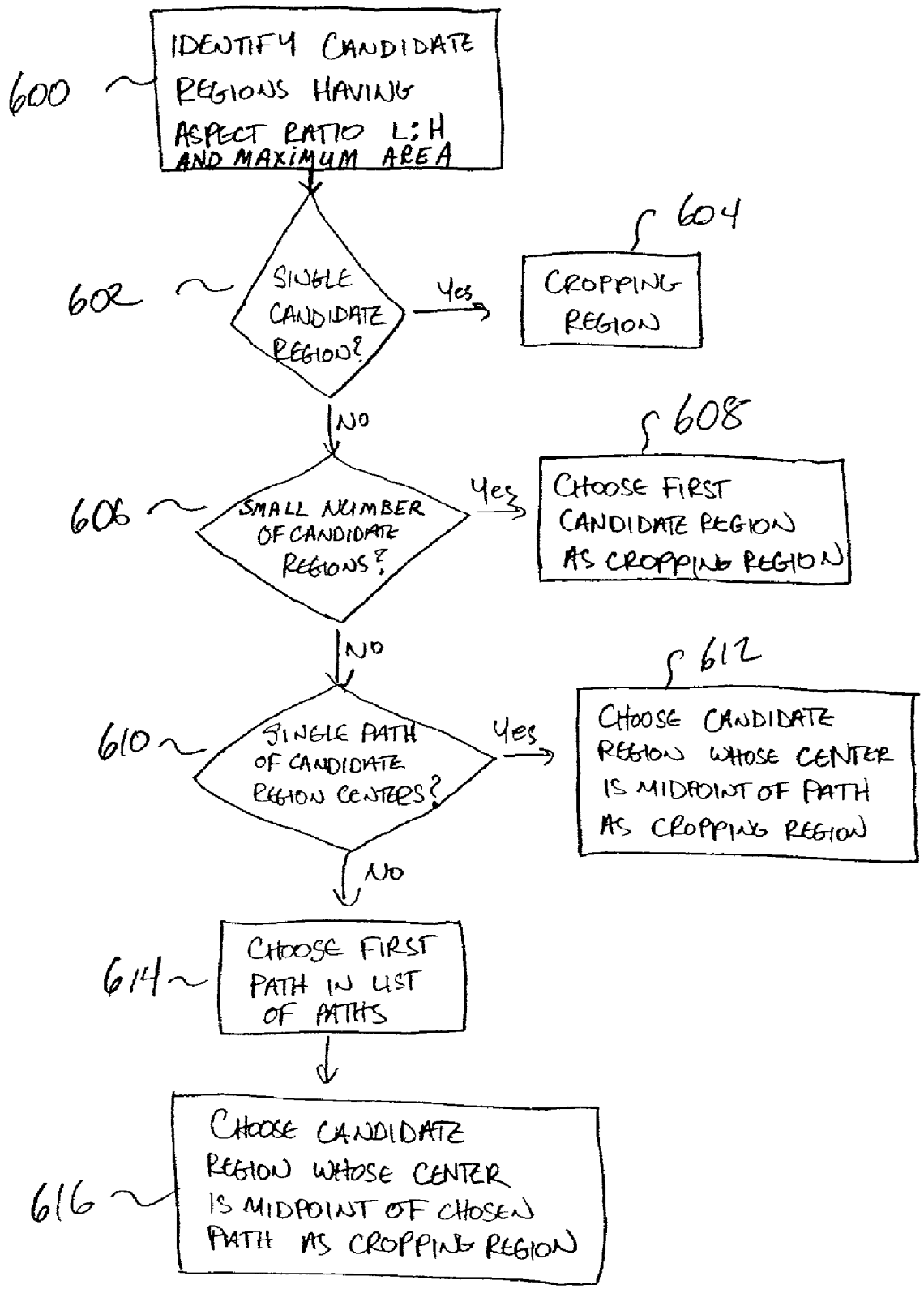
FIG. 6 illustrates in block diagram form, an embodiment of the step of selecting a cropping region according to the preferred cropping criterion.

Referring to FIG. 6, an extended neighborhood is used to compute relative saliency features. First, a minimum bounding rectangle (MBR) 14 of a region of concern 10 (shown by the central circular region) is determined. Next, this MBR is extended in all four directions (stopping at the image borders wherever applicable) of the region using an appropriate factor (for example, 2). All regions intersecting this stretched MBR 12, which is indicated by the dotted lines, are considered neighbors of the region. This extended neighborhood ensures adequate context as well natural scalability for computing the relative saliency features.

The following structural saliency features are computed.

Contrast in Hue (a Relative Saliency Feature)

In terms of color, the contrast in hue between an object and its surrounding is a good indication of the saliency in color.

$$\text{contrast}_{color} = \sum_{neighborhood} \frac{\|hue - hue_{surrounding}\|}{hue_{surrounding}} \quad (1)$$

where the neighborhood refers to the context previously defined and henceforth.

colorfulness (a self-saliency feature) and contrast in colorfulness (a relative saliency feature)

In terms of colorfulness, the contrast between a colorful object and a dull surrounding is almost as good an indicator as the contrast between a dull object and a colorful surrounding. Therefore, the contrast in colorfulness should always be positive. In general, it is advantageous to treat a self saliency and the corresponding relative saliency as separate features rather than combining them using certain heuristics. The influence of each feature will be determined separately by the training process, which will be described later.

$$\text{colorfulness} = \text{saturation} \quad (2)$$

$$\text{contrast}_{colorfulness} = \frac{\|saturation - saturation_{surrounding}\|}{saturation_{surrounding}} \quad (3)$$

brightness (a self-saliency feature) and contrast in brightness (a relative saliency feature)

In terms of brightness, the contrast between a bright object and a dark surrounding is almost as good as the contrast between a dark object and a bright surrounding. In particular, the main subject tends to be lit up in flash scenes.

$$\text{brightness} = \text{luminance} \quad (4)$$

$$\text{contrast}_{brightness} = \frac{|brightness - brightness_{surrounding}|}{brightness_{surrounding}} \quad (5)$$

texturefulness (a self-saliency feature) and contrast in texturefulness (a relative saliency feature)

In terms of texturefulness, in general, a large uniform region with very little texture tends to be the background. On the other hand, the contrast between a highly textured object and a nontextured or less textured surrounding is a good indication of main subjects. The same holds for a non-textured or less textured object and a highly textured surrounding.

$$\text{texturefulness} = \text{texture\_energy} \quad (6)$$

$$\text{contrast}_{texturefulness} = \frac{|texturefulness - texturefulness_{surrounding}|}{texturefulness_{surrounding}} \quad (7)$$

Location (a Self-saliency Feature)

In terms of location, the main subject tends to be located near the center instead of the peripheral of the image, though not necessarily right in the center of the image. In fact, professional photographers tend to position the main subject at the horizontal gold partition positions.

The centroid of a region alone is usually not sufficient to indicate the location of the region without any indication of its size and shape. A centrality measure is defined by computing the integral of a probability density function (PDF) over the area of a given region. The PDF is derived from a set of training images, in which the main subject regions are manually outlined, by summing up the ground truth maps over the entire training set. In other words, the PDF represents the distribution of main subjects in terms of location. A more important advantage of this centrality measure is that every pixel of a given region, not just the centroid, contributes to the centrality measure of the region to a varying degree depending on its location.

$$\text{centrality} = \frac{1}{N_R} \sum_{(x,y) \in R} PDF_{\text{MSD\_location}}(x, y) \quad (8)$$

where (x,y) denotes a pixel in the region R, $N_R$ is the number of pixels in region R, and $PDF_{MSD\_location}$ denotes a 2D probability density function (PDF) of main subject location. If the orientation is unknown, the PDF is symmetric about the center of the image in both vertical and horizontal directions, which results in an orientation-independent centrality measure. An orientation-unaware PDF is shown in FIG. 4(a) and the projection in the width and height directions are also shown in FIG. 4(b) and FIG. 4(c), respectively. If the orientation is known, the PDF is symmetric about the center of the image in the horizontal direction but not in the vertical direction, which results in an orientation-aware centrality measure. An orientation-aware PDF is shown in FIG. 5(a) and the projection in the horizontal and vertical directions are also shown in FIG. 5(b) and FIG. 5(c), respectively.

Size (a Self Saliency Feature)

Main subjects should have considerable but reasonable sizes. However, in most cases, very large regions or regions that span at least one spatial direction (for example, the horizontal direction) are most likely to be background regions, such as sky, grass, wall, snow, or water. In general, both very small and very large regions should be discounted.

$$\text{size} = \begin{cases} 0 & \text{if } s > s4 \\ 1 - \frac{s-s2}{s3-s2} & \text{if } s > s3 \text{ and } s < s4 \\ 1 & \text{if } s > s2 \text{ and } s < s3 \\ \frac{s-s1}{s2-s1} & \text{if } s > s1 \text{ and } s < s2 \\ 0 & \text{if } s < s1 \end{cases} \quad (9)$$

where s1, s2, s3, and s4 are predefined threshold (s1<s2<s3<s4).

In practice, the size of a region is measured as a fraction of the entire image size to achieve invariance to scaling.

$$\text{size} = \frac{\text{region}_{\text{pixels}}}{\text{image}_{\text{pixels}}} \quad (10)$$

In this invention, the region size is classified into one of three bins, labeled "small," "medium " and "large " using two thresholds s2 and s3, where s2<s3.

Shape (a Self-saliency Feature) and Contrast in Shape (a Relative Saliency Feature)

In general, objects that have distinctive geometry and smooth contour tend to be man-made and thus have high likelihood to be main subjects. For example, square, round, elliptic, or triangle shaped objects. In some cases, the contrast in shape indicates conspicuity (for example, a child among a pool of bubble balls).

The shape features are divided into two categories, self salient and relatively salient. Self salient features characterize the shape properties of the regions themselves and relatively salient features characterize the shape properties of the regions in comparison to those of neighboring regions.

The aspect ratio of a region is the major axis/minor axis of the region. A Gaussian belief function maps the aspect ratio to a belief value. This feature detector is used to discount long narrow shapes from being part of the main subject.

Three different measures are used to characterize the convexity of a region: (1) perimeter-based—perimeter of the convex hull divided by the perimeter of region; (2) area-based—area of region divided by the area of the convex hull; and (3) hyperconvexity—the ratio of the perimeter-based convexity and area-based convexity. In general, an object of complicated shape has a hyperconvexity greater than 1.0. The three convexity features measure the compactness of the region. Sigmoid belief functions are used to map the convexity measures to beliefs.

The rectangularity is the area of the MBR of a region divided by the area of the region. A sigmoid belief function maps the rectangularity to a belief value. The circularity is the square of the perimeter of the region divided by the area of region. A sigmoid belief function maps the circularity to a belief value.

Relative shape-saliency features include relative rectangularity, relative circularity and relative convexity. In particular, each of these relative shape features is defined as the average difference between the corresponding self salient shape feature of the region and those of the neighborhood regions, respectively. Finally, a Gaussian function is used to map the relative measures to beliefs.

Symmetry (a Self-saliency Feature)

Objects of striking symmetry, natural or artificial, are also likely to be of great interest. Local symmetry can be computed using the method described by V. D. Gesu, et al., "Local operators to detect regions of interest," *Pattern Recognition Letters*, vol. 18, pp. 1077–1081, 1997.

Spatial Relationship (a Relative Saliency Feature)

In general, main subjects tend to be in the foreground. Consequently, main subjects tend to share boundaries with a lot of background regions (background clutter), or be enclosed by large background regions such as sky, grass, snow, wall and water, or occlude other regions. These characteristics in terms of spatial relationship may reveal the region of attention. Adjacency, surroundedness and occlusion are the main features in terms of spatial relationship. In many cases, occlusion can be inferred from T-junctions (L. R. Williams, "Perceptual organization of occluding contours," in *Proc. IEEE Int. Conf. Computer Vision,* 1990) and fragments can be grouped based on the principle of perceptual occlusion (J. August, et al., "Fragment grouping via the principle of perceptual occlusion," in *Proc. IEEE Int. Conf. Pattern Recognition,* 1996).

In particular, a region that is nearly completely surrounded by a single other region is more likely to be the main subject. Surroundedness is measured as the maximum fraction of the region's perimeter that is shared with any one neighboring region. A region that is totally surrounded by a single other region has the highest possible surroundedness value of 1.0.

$$\text{surroundedness} = \max_{\text{neighbors}} \frac{\text{length\_of\_common\_border}}{\text{region\_perimeter}} \quad (11)$$

Borderness (a Self-saliency Feature)

Many background regions tend to contact one or more of the image borders. In other words, a region that has significant amount of its contour on the image borders tends to belong to the background. The percentage of the contour points on the image borders and the number of image borders shared (at most four) can be good indications of the background.

In the case where the orientation is unknown, one borderness feature places each region in one of six categories determined by the number and configuration of image borders the region is "in contact" with. A region is "in contact" with a border when at least one pixel in the region falls within a fixed distance of the border of the image. Distance is expressed as a fraction of the shorter dimension of the image. The six categories for borderness_a are defined in Table1.

TABLE 1

Categories for orientation-independent borderness_a.

| Category | The region is in contact with . . . |
|---|---|
| 0 | none of the image borders |
| 1 | exactly one of the image borders |
| 2 | exactly two of the image borders, adjacent to one another |
| 3 | exactly two of the image borders, opposite to one another |
| 4 | exactly three of the image borders |
| 5 | exactly four (all) of the image borders |

Knowing the proper orientation of the image allows us to refine the borderness feature to account for the fact that regions in contact with the top border are much more likely to be background than regions in contact with the bottom. This feature places each region in one of 12 categories determined by the number and configuration of image borders the region is "in contact" with, using the definition of "in contact" with from above. The four borders of the image are labeled as "Top", "Bottom", "Left", and "Right" according to their position when the image is oriented with objects in the scene standing upright. In this case, the twelve categories for borderness_b are defined in Table 2, which lists each possible combination of borders a region may be in contact with, and gives the category assignment for that combination.

TABLE 2

Categories for orientation-dependent borderness_a.

| The region is in contact with . . . | | | | Category |
|---|---|---|---|---|
| Top | Bottom | Left | Right | Category |
| N | N | N | N | 0 |
| N | Y | N | N | 1 |
| Y | N | N | N | 2 |
| N | N | Y | N | 3 |
| N | N | N | Y | 3 |
| N | Y | Y | N | 4 |
| N | Y | N | Y | 4 |
| Y | N | N | N | 5 |
| Y | N | N | N | 5 |
| Y | Y | N | N | 6 |
| N | N | Y | Y | 7 |
| N | Y | Y | Y | 8 |
| Y | Y | Y | N | 9 |
| Y | Y | N | Y | 9 |
| Y | N | Y | Y | 10 |
| Y | Y | Y | Y | 11 |

Regions that include a large fraction of the image border are also likely to be background regions. This feature indicates what fraction of the image border is in contact with the given region.

$$borderness\_b = \frac{perimeter\_pixels\_in\_this\_reigion}{2*(image\_height+image\_width-2)} \quad (12)$$

When a large fraction of the region perimeter is on the image border, a region is also likely to be background. Such a ratio is unlikely to exceed 0.5, so a value in the range [0, 1] is obtained by scaling the ratio by a factor of 2 and saturating the ratio at the value of 1.0.

$$borderness\_c = \frac{min(1, 2*num\_region\_perimeter\_pixels\_on\_border)}{region\_perimeter} \quad (13)$$

Again, note that instead of a composite borderness measure based on heuristics, all the above three borderness measures are separately trained and used in the main subject detection.

Semantic Saliency Features

Flesh/Face/People (Foreground, Self Saliency Features)

A majority of photographic images have people and about the same number of images have sizable faces in them. In conjunction with certain shape analysis and pattern analysis, some detected flesh regions can be identified as faces. Subsequently, using models of human figures, flesh detection and face detection can lead to clothing detection and eventually people detection.

The current flesh detection algorithm utilizes color image segmentation and a pre-determined flesh distribution in a chrominance space (Lee, "*Color image quantization based on physics and psychophysics,*" *Journal of Society of Photographic Science and Technology of Japan*, Vol. 59, No. 1, pp. 212–225, 1996). The flesh region classification is based on Maximum Likelihood Estimation (MLE) according to the average color of a segmented region. The conditional probabilities are mapped to a belief value via a sigmoid belief function.

A primitive face detection algorithm is used in the present invention. It combines the flesh map output by the flesh detection algorithm with other face heuristics to output a belief in the location of faces in an image. Each region in an image that is identified as a flesh region is fitted with an ellipse. The major and minor axes of the ellipse are calculated as also the number of pixels in the region outside the ellipse and the number of pixels in the ellipse not part of the region. The aspect ratio is computed as a ratio of the major axis to the minor axis. The belief for the face is a function of the aspect ratio of the fitted ellipse, the area of the region outside the ellipse, and the area of the ellipse not part of the region. A Gaussian belief sensor function is used to scale the raw function outputs to beliefs.

It will be appreciated that a person of ordinary skill in the art can use a different face detection method without departing from the present invention.

Key Background Subject Matters (Self Saliency Features)

There are a number of objects that frequently appear in photographic images, such as sky, cloud, grass, tree, foliage, vegetation, water body (river, lake, pond), wood, metal, and the like. Most of them have high likelihood to be background objects. Therefore, such objects can be ruled out while they also serve as precursors for main subjects as well as scene types.

Among these background subject matters, sky and grass (may include other green vegetation) are detected with relatively high confidence due to the amount of constancy in terms of their color, texture, spatial extent, and spatial location.

Probabilistic Reasoning

All the saliency features are integrated by a Bayes net to yield the likelihood of main subjects. On one hand, different evidences may compete with or contradict each other. On the other hand, different evidences may mutually reinforce each other according to prior models or knowledge of typical photographic scenes. Both competition and reinforcement are resolved by the Bayes net-based inference engine.

A Bayes net (J. Pearl, *Probabilistic Reasoning in Intelligent Systems*, San Francisco, Calif.: Morgan Kaufmann, 1988) is a directed acyclic graph that represents causality relationships between various entities in the graph. The direction of links represents causality. It is an evaluation means knowing joint Probability Distribution Function (PDF) among various entities. Its advantages include explicit uncertainty characterization, fast and efficient computation, quick training, high adaptivity and ease of building, and representing contextual knowledge in human reasoning framework A Bayes net consists of four components:

1. Priors: The initial beliefs about various nodes in the Bayes net
2. Conditional Probability Matrices (CPMs): the statistical relationship between two connected nodes in the Bayes net
3. Evidences: Observations from feature detectors that are input to the Bayes net
4. Posteriors: The final computed beliefs after the evidences have been propagated through the Bayes net.

Figure 7:
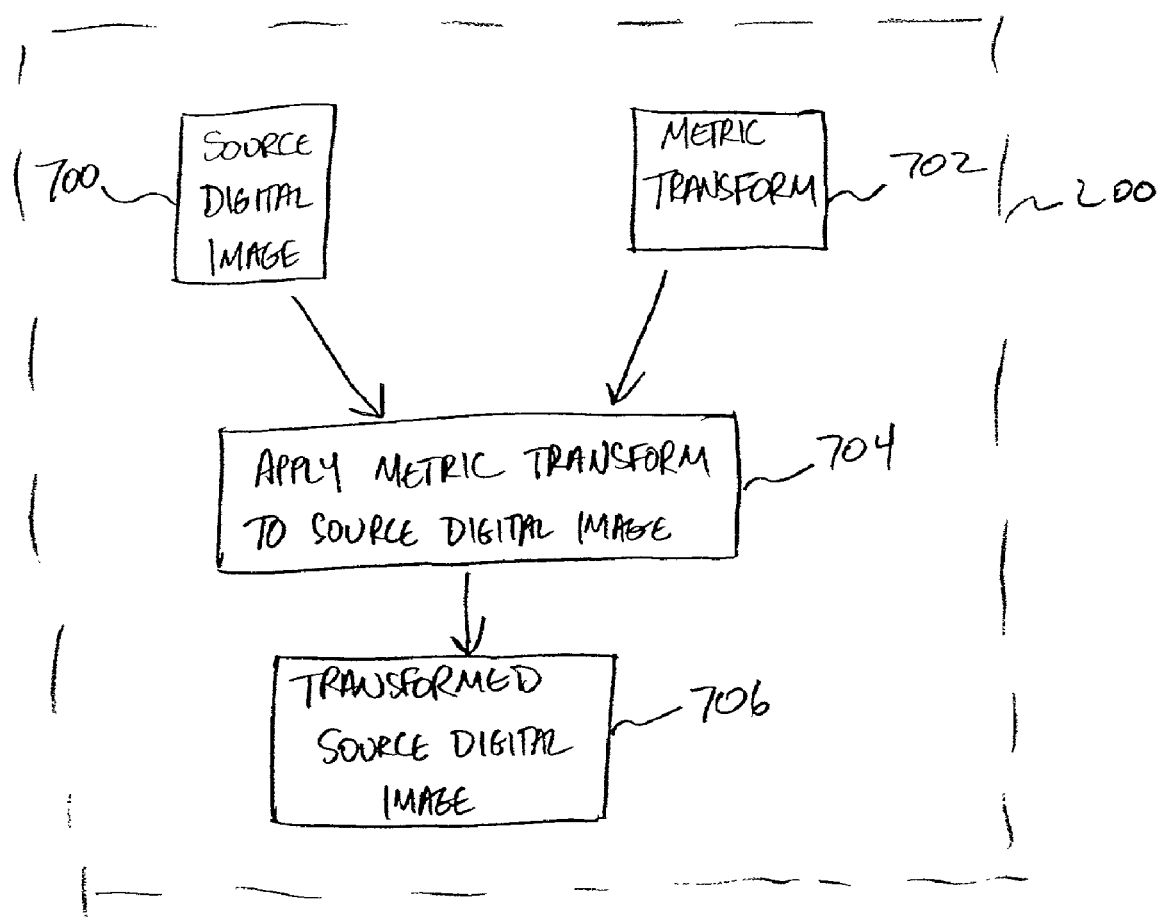
FIG. 7 illustrates in block diagram form, a further embodiment of the step of providing source digital images.

Referring to FIG. 7, a two-level Bayesian net is used in the present invention that assumes conditional independence between various feature detectors. The main subject is determined at the root node 20 and all the feature detectors are at the leaf nodes 22. There is one Bayes net active for each region (identified by the segmentation algorithm) in the image. The root node gives the posterior belief in that region being part of the main subject. It is to be understood that the present invention can be used with a Bayes net that has more than two levels without departing from the scope of the present invention.

Training Bayes Nets

One advantage of Bayes nets is each link is assumed to be independent of links at the same level. Therefore, it is convenient for training the entire net by training each link separately, i.e., deriving the CPM for a given link independent of others. In general, two methods are used for obtaining CPM for each root-feature node pair:

1. Using Expert Knowledge

This is an ad-hoc method. An expert is consulted to obtain the conditional probabilities of each feature detector observing the main subject given the main subject.

2. Using Contingency Tables

This is a sampling and correlation method. Multiple observations of each feature detector are recorded along with information about the main subject. These observations are then compiled together to create contingency tables which, when normalized, can then be used as the CPM. This method is similar to neural network type of training (learning). This method is preferred in the present invention.

Consider the CPM for centrality as an example. This matrix was generated using contingency tables derived from the ground truth and the feature detector. Since the feature detector in general does not supply a binary decision (referring to Table 3), fractional frequency count is used in deriving the CPM. The entries in the CPM are determined by $$CPM = \left[\left(\sum_{i \in I} \sum_{r \in R_i} n_i F_r^T T_r\right) P\right]^T \quad (14)$$

$$F_r = [f_0^r \; f_1^r \; \cdots \; f_M^r], \quad T_r = [t_0^r \; t_1^r \; \cdots \; t_L^r],$$

$$P = diag\{p_j\}, \quad p_j = \left(\sum_{i \in I} \sum_{r \in R_i} n_i t_r\right),$$

where I is the set of all training images, $R_i$ is the set of all regions in image i, $n_i$ is the number of observations (observers) for image i. Moreover, $F_r$ represents an M-label feature vector for region r, $T_r$ represents an L-level ground-truth vector, and P denotes an L×L diagonal matrix of normalization constant factors. For example, in Table 3, regions 1, 4, 5 and 7 contribute to boxes 00, 11, 10 and 01 in Table 4, respectively. Note that all the belief values have been normalized by the proper belief sensors. As an intuitive interpretation of the first column of the CPM for centrality, a "central" region is about twice as likely to be the main subject than not a main subject.

TABLE 3

An example of training the CPM.

| Region Number | Ground Truth | Feature Detector Output | Contribution |
|---|---|---|---|
| 1 | 0 | 0.017 | 00 |
| 2 | 0 | 0.211 | 00 |
| 3 | 0 | 0.011 | 00 |
| 4 | 0.933 | 0.953 | 11 |
| 5 | 0 | 0.673 | 10 |
| 6 | 1 | 0.891 | 11 |
| 7 | 0.93 | 0.072 | 01 |
| 8 | 1 | 0.091 | 01 |

TABLE 4

The trained CPM.

| | Feature = 1 | feature = 0 |
|---|---|---|
| Main subject = 1 | 0.35 (11) | 0.65 (01) |
| Main subject = 0 | 0.17 (10) | 0.83 (00) |

The output of the algorithm is in the form of a list of segmented regions ranked in a descending order of their likelihood as potential main subjects for a generic or specific application. Furthermore, this list can be converted into a map in which the brightness of a region is proportional to the main subject belief of the region. This "belief" map is more than a binary map that only indicates location of the determined main subject. The associated likelihood is also attached to each region so that the regions with large brightness values correspond to regions with high confidence or belief being part of the main subject. This reflects the inherent uncertainty for humans to perform such a task However, a binary decision, when desired, can be readily obtained by applying an appropriate threshold to the belief map. Moreover, the belief information may be very useful for downstream applications. For example, different weighting factors can be assigned to different regions in determining bit allocation for image coding.

(Quoting the Detailed Description of the Invention)

Referring next to FIG. 6, a block diagram of the method for choosing a candidate region according to the preferred cropping criterion 204 is shown. First, any composite digital image region having aspect ratio L:H and maximum area is identified 600 as a candidate region. A query 602 is made as to whether there is a single candidate region. An affirmative response means that the candidate region is chosen 604 as the cropping region. A negative response leads to a query 606 as to whether there are a small number of candidate regions. An affirmative response means that one candidate region 608 is chosen as the cropping region. The candidate region can be chosen arbitrarily, for example, by listing all of the candidate regions, and then by choosing the first candidate region in the list. A negative response leads to a query 610 as to whether there is a single path containing centers of candidate regions. An affirmative response leads to the choice 612 of the candidate region whose center corresponds to the midpoint of the path as the cropping region. A negative response leads to the choice 614 of one of the paths. The path can be chosen arbitrarily for example, by listing all of the paths, and then by choosing the first path in the list. The candidate region whose center corresponds to the midpoint of the chosen path is chosen 616 as the cropping region.

Referring next to FIG. 7, the step 200 of providing at least two source digital images further comprises the step 704 of applying a metric transform 702 to a source digital image 700 to yield a transformed source digital image 706. A metric transform refers to a transformation that is applied to the pixel values of a source digital image, the transformation yielding transformed pixel values that are linearly or logarithmically related to scene intensity values. In instances where metric transforms are independent of the particular content of the scene, they are referred to as scene independent transforms.

In one example of such an embodiment, a source digital image 700 was provided from a digital camera, and contains pixel values in the sRGB color space (see Stokes et al., "A Standard Default Color Space for the Internet—sRGB", http://www.color.org/sRGB.html, pp. 1–12). A metric transform 702 is used to convert the pixel values into nonlinearly encoded Extended Reference Input Medium Metric (ERIMM) (PIMA standard #7466, found on the World Wide Web at (http://www.pima.net/standards/it10/IT10_POW.htm), so that the pixel values are logarithmically related to scene intensity values.

The metric transform is applied to rendered digital images, i.e. digital images that have been processed to produce a pleasing result when viewed on an output device such as a CRT monitor or a reflection print. For digital images encoded in the sRGB metric transform is a gamma compensation lookup table that is applied to the source digital image 700 first. The formula for the gamma compensation lookup table is as follows. For each code value cv, ranging from 0 to 255, an exposure value ev is calculated based on the logic:

if $(cv =< 10.015)$ $ev = cv/(255*12.92)$ otherwise $ev = (cv/255) + 0.055)/1.055)^{0.45}$ Once the pixel values are modified with the gamma compensation lookup table, a color matrix transform is applied to compensate for the differences between the sRGB color primaries and the ERIMM metric color primaries. The nine elements of the color matrix τ are given by:

0.5229 0.3467 0.1301

0.0892 0.8627 0.0482

0.0177 0.1094 0.8727

The color matrix is applied to the red, green, blue pixel data as $R' = \tau_{11}R + \tau_{12}G + \tau_{13}B$ $G' = \tau_{21}R + \tau_{22}G + \tau_{23}B$ $B' = \tau_{31}R + \tau_{3}G + \tau_{33}B$ where the R, G, B terms represent the red, green, blue pixel values to be processed by the color matrix and the R', G', B' terms represent the transformed red, green, blue pixel values. The R', G', and B' pixel values are then converted to a log domain representation thus completing the metric transformation from sRGB to ERIMM.

Figure 8A:
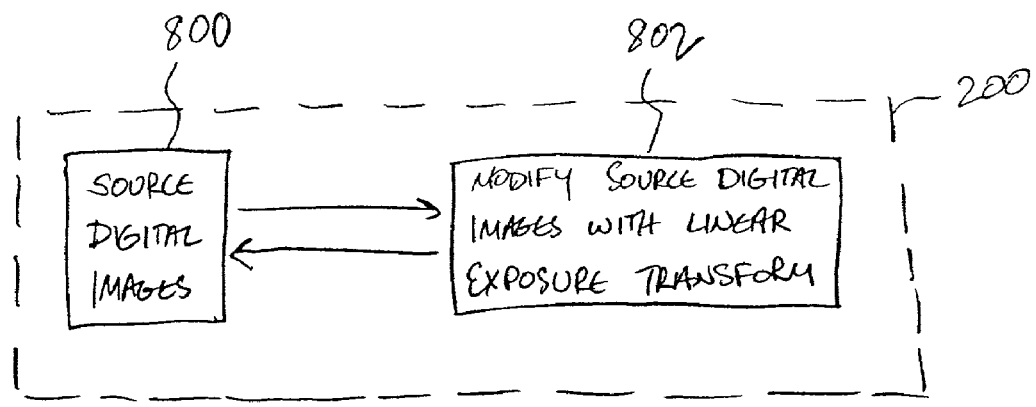
FIGS. 8A and 8B illustrate in block diagram form, further embodiments of the step of providing source digital images.

Referring next to FIG. 8A, the step 200 of providing at least two source digital images further comprises the step 802 of modifying the pixel values of at least one of the source digital images 800 by a linear exposure transform so that the pixel values in the overlap regions of overlapping source digital images are similar. A linear exposure transform refers to a transformation that is applied to the pixel values of a source digital image, the transformation being linear with respect to the scene intensity values at each pixel. Examples of linear exposure transforms can be found in the aforementioned Cahill, Gindele, Gallagher, and Spaulding reference.

Figure 8B:
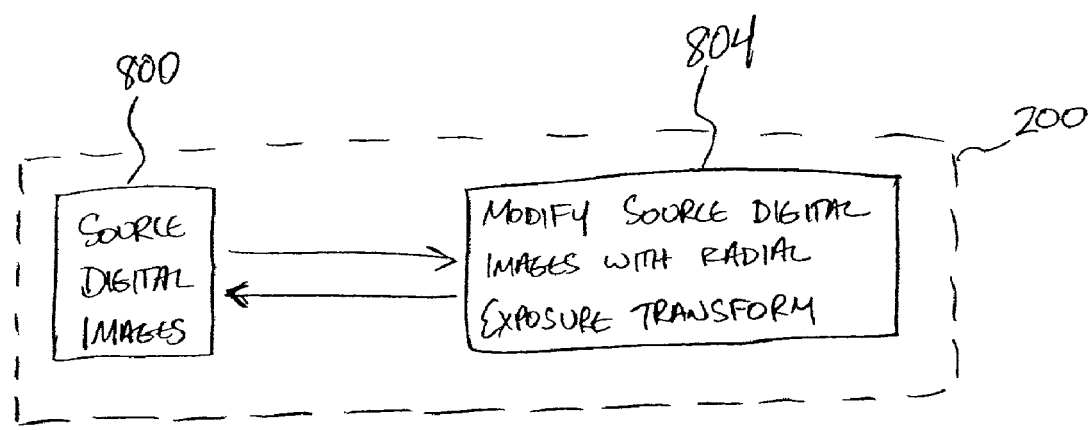

Referring next to FIG. 8B, the step 200 of providing at least two source digital images further comprises the step 804 of modifying the pixel values of at least one of the source digital images 800 by a radial exposure transform so that any light falloff present in the source digital images is compensated. A radial exposure transform refers to a transformation that is applied to the pixel values of a source digital image, the transformation being a function of the distance from the pixel to the center of the image. Examples of radial exposure transforms can be found in the aforementioned Cahill and Gindele reference.

Figure 9:
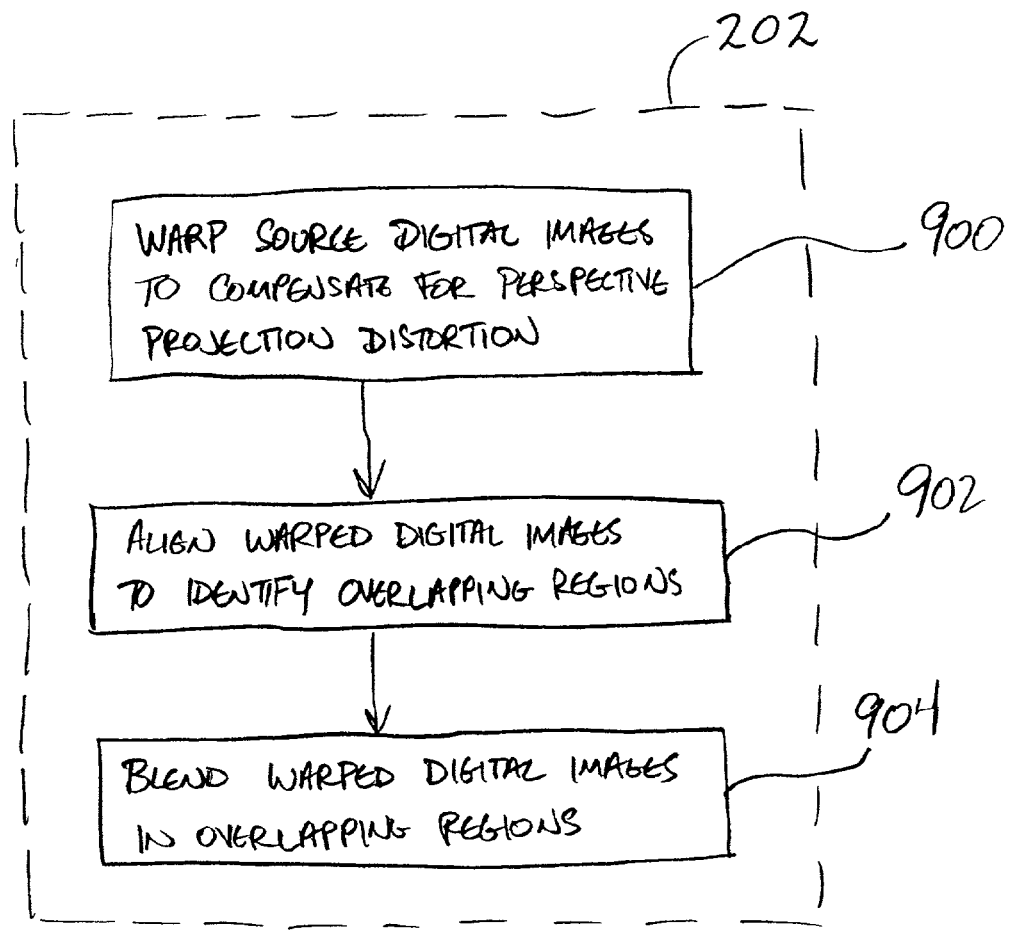
FIG. 9 illustrates in block diagram form, a further embodiment of the step of combining source digital images.

Referring next to FIG. 9, a more detailed description of the step 206 of combining source digital images is described. The source digital images are geometrically warped 900 to compensate for distortion due to perspective projection. In a physical sense, this distortion would not exist if the sensor were not planar, but rather spherical (with the radius of the sphere depending on the focal length of the lens). The warped source digital images are then aligned 902 to identify the overlapping regions. The alignment procedure is performed using any of the aforementioned techniques, such as phase correlation or cross correlation. Once the source digital images have been aligned, they are blended 904 in the overlapping regions.

Figure 10:
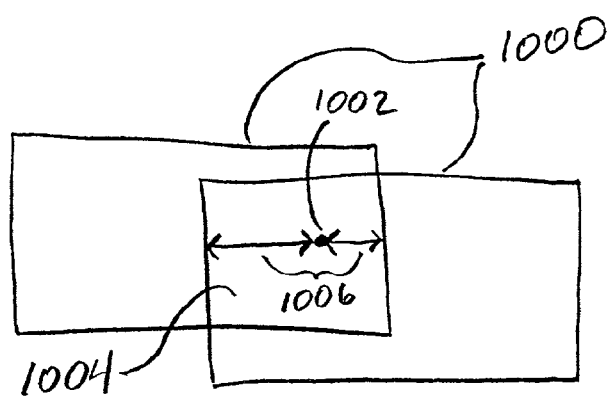
FIG. 10 is a diagram useful in describing the step of combining the adjusted source digital images.

Referring next to FIG. 10, the blending step 904 further comprises a feathering scheme, weighted averages, or some other technique known in the art, to form a composite digital image. In one embodiment, a pixel 1002 in the overlap region 1004 is assigned a value based on a weighted average of the pixel values from both source digital images 1000; the weights are based on its relative distances 1006 to the edges of the source digital images 1000.

Figure 11:
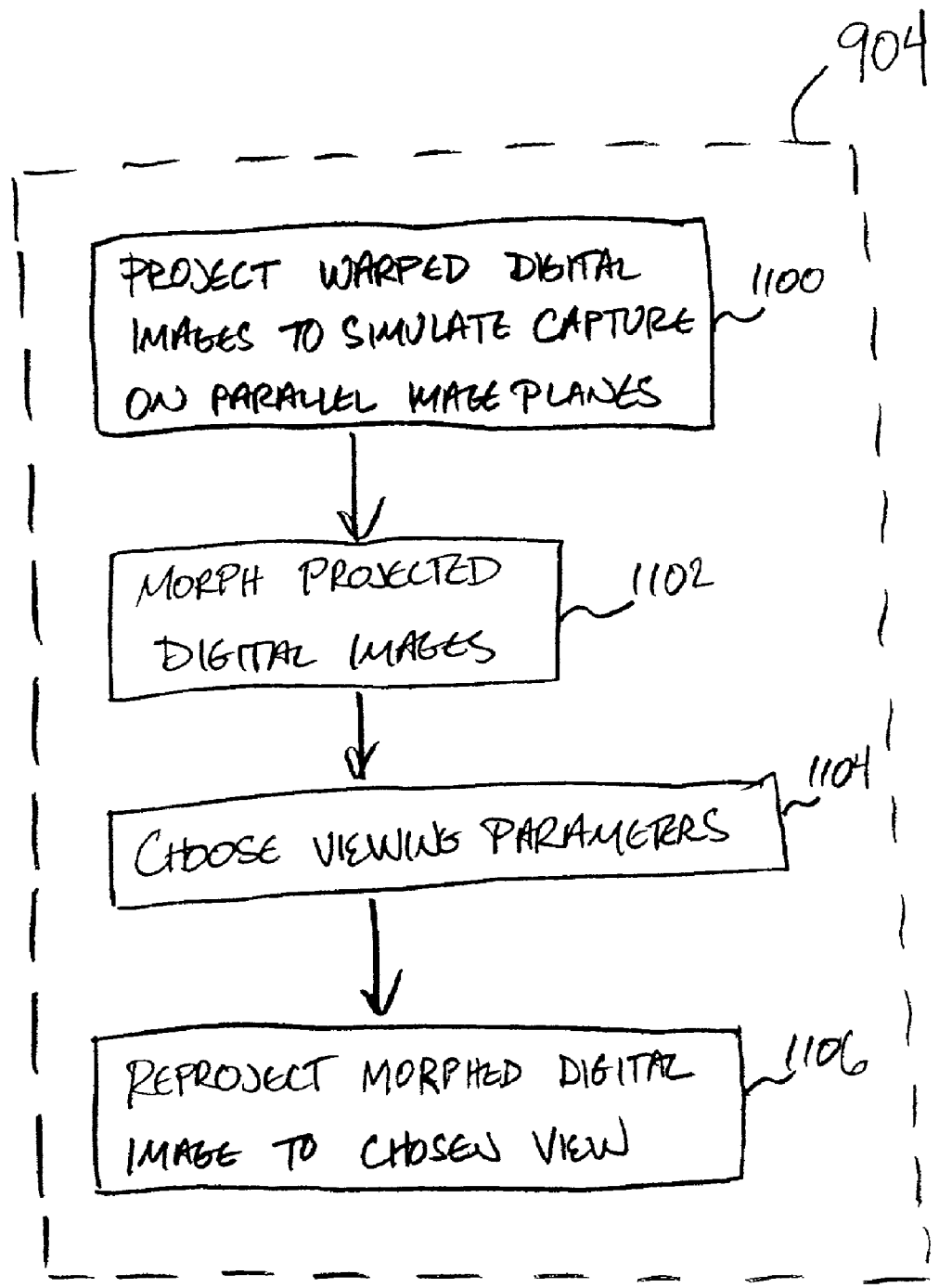
FIG. 11 illustrates in block diagram form, a further embodiment of the step of blending warped digital images.

Referring next to FIG. 11, a further embodiment of the step 904 of blending warped digital images is described. The warped digital images are projected 1100 to simulate capture on parallel image planes. This is done by estimating the fundamental matrix relating the two images. The fundamental matrix, described in the aforementioned Zhang, Deriche, Faugeras, and Luong reference, contains all of the information pertinent to the geometrical relationship between two cameras. Once the warped digital images have been projected 1100 to simulate capture on parallel image planes, they are morphed 1102 using a standard image morphing procedure, such as the procedure described in the aforementioned Beier and Neely reference, producing a morphed digital image. A set of viewing parameters at which to view the morphed digital image is chosen 1104, and the morphed digital image is then reprojected 1106 to the chosen viewing parameters, producing the composite image. The blending step 904 described in this embodiment is the well known view morphing procedure, described in the aforementioned Seitz and Dyer reference.

Figure 12A:
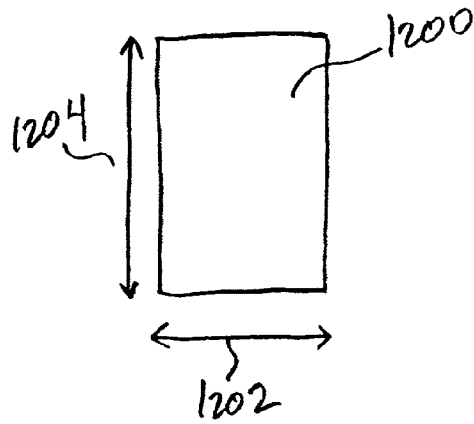
FIGS. 12A and 12B are diagrams useful in describing the aspect ratio of an image.
Figure 12B:
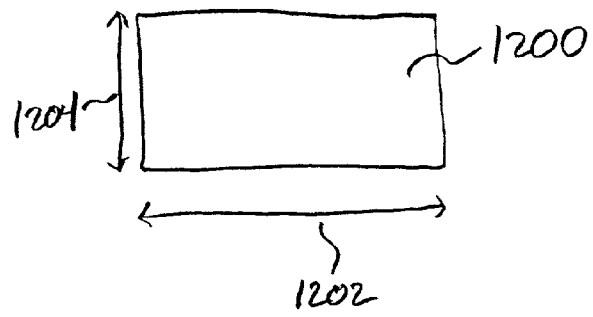

Referring next to FIGS. 12A and 12B, the aspect ratio of an image 1200 is defined as the ratio of the length 1202 of the image to its height 1204. When the width 1204 of the image is greater than its length 1202, as depicted in FIG. 12A, the aspect ratio is less than one, and is referred to as a portrait aspect ratio. When the width 1204 of the image is less than its length 1202, as depicted in FIG. 12B, the aspect ratio is greater than one, and is referred to as a landscape aspect ratio. Advanced Photo System (APS) cameras provide the choice of three different aspect ratios: HDTV (H), a 16:9 aspect ratio, Classic (C), a 3:2 aspect ratio, or Panoramic (P), a 3:1 aspect ratio. These aspect ratios are all landscape aspect ratios, but the APS camera can be rotated to capture images with the corresponding portrait aspect ratios 9:16, 2:3, and 1:3.

Figure 13A:
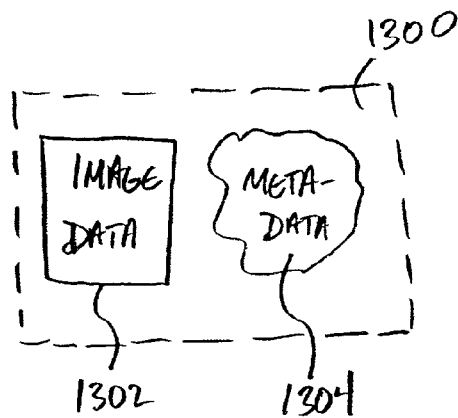
FIGS. 13A and 13B illustrate a source digital image file containing image data and meta-data.
Figure 13B:
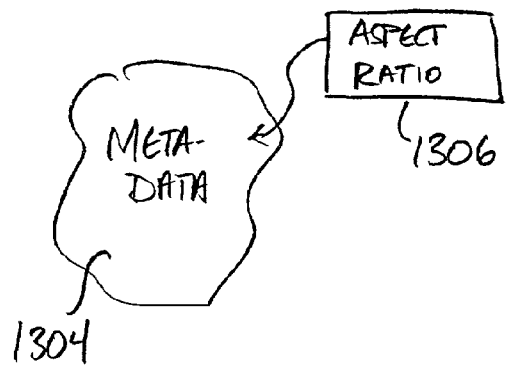
Figure 1:
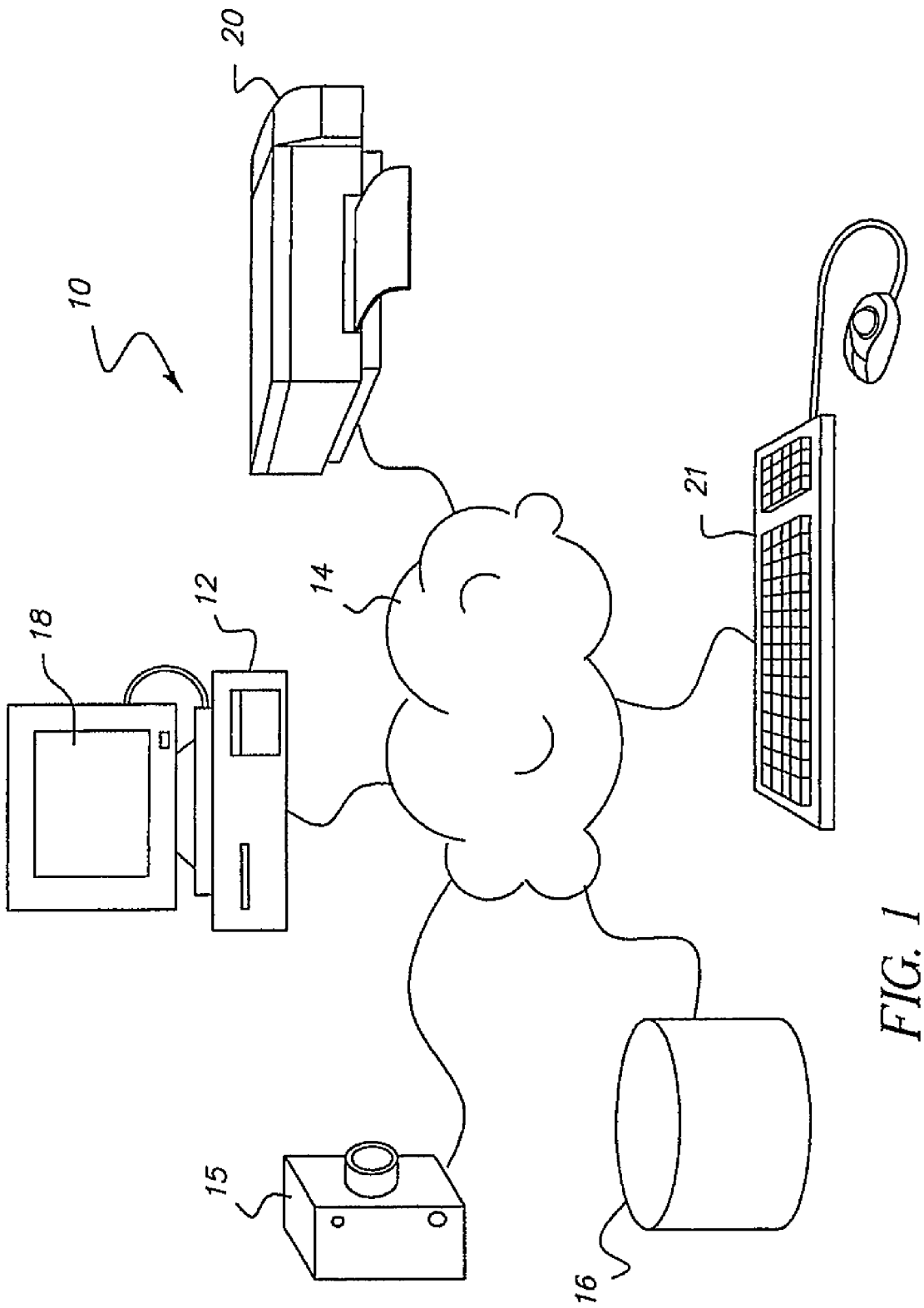
Figure 2:
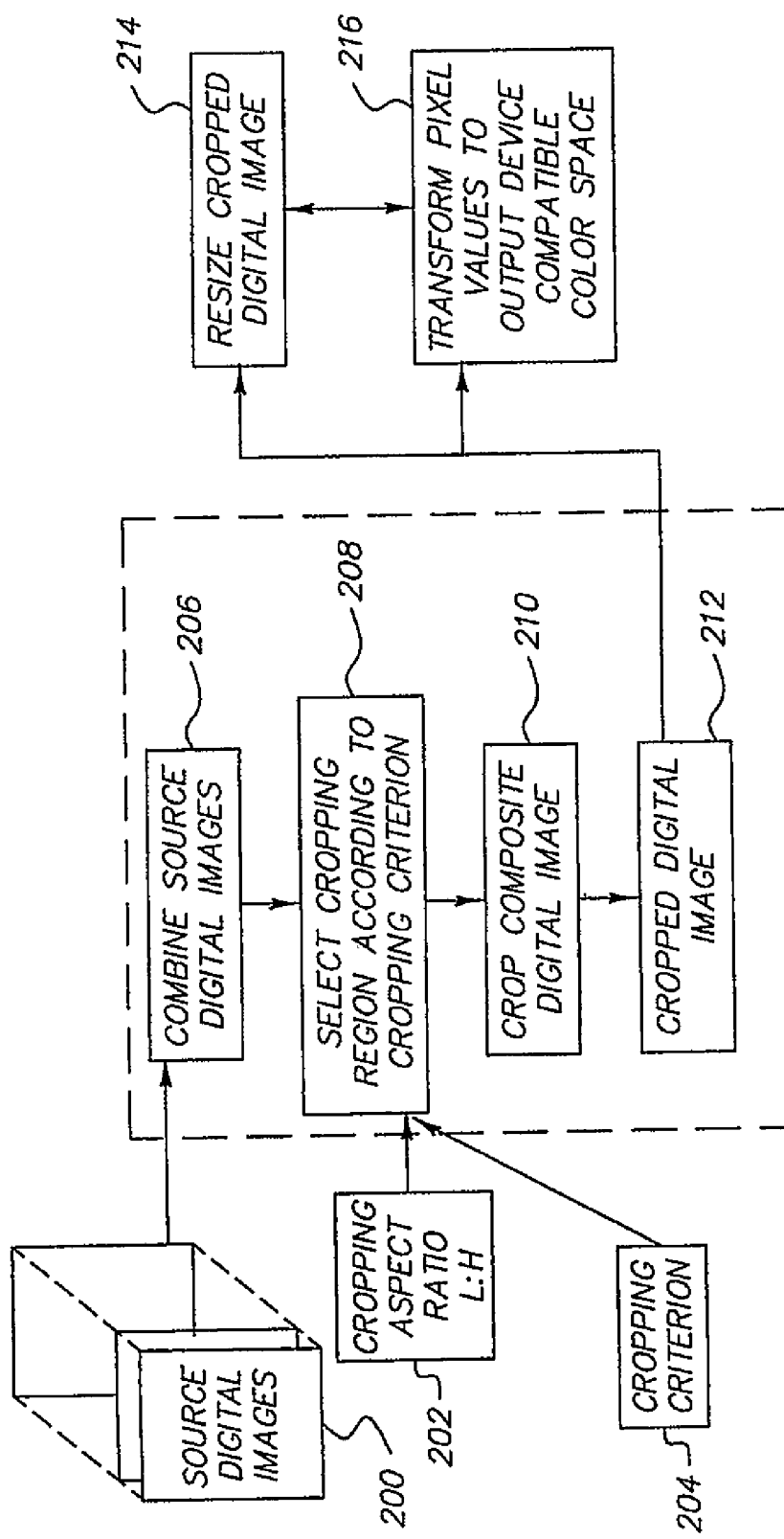
Figure 3:
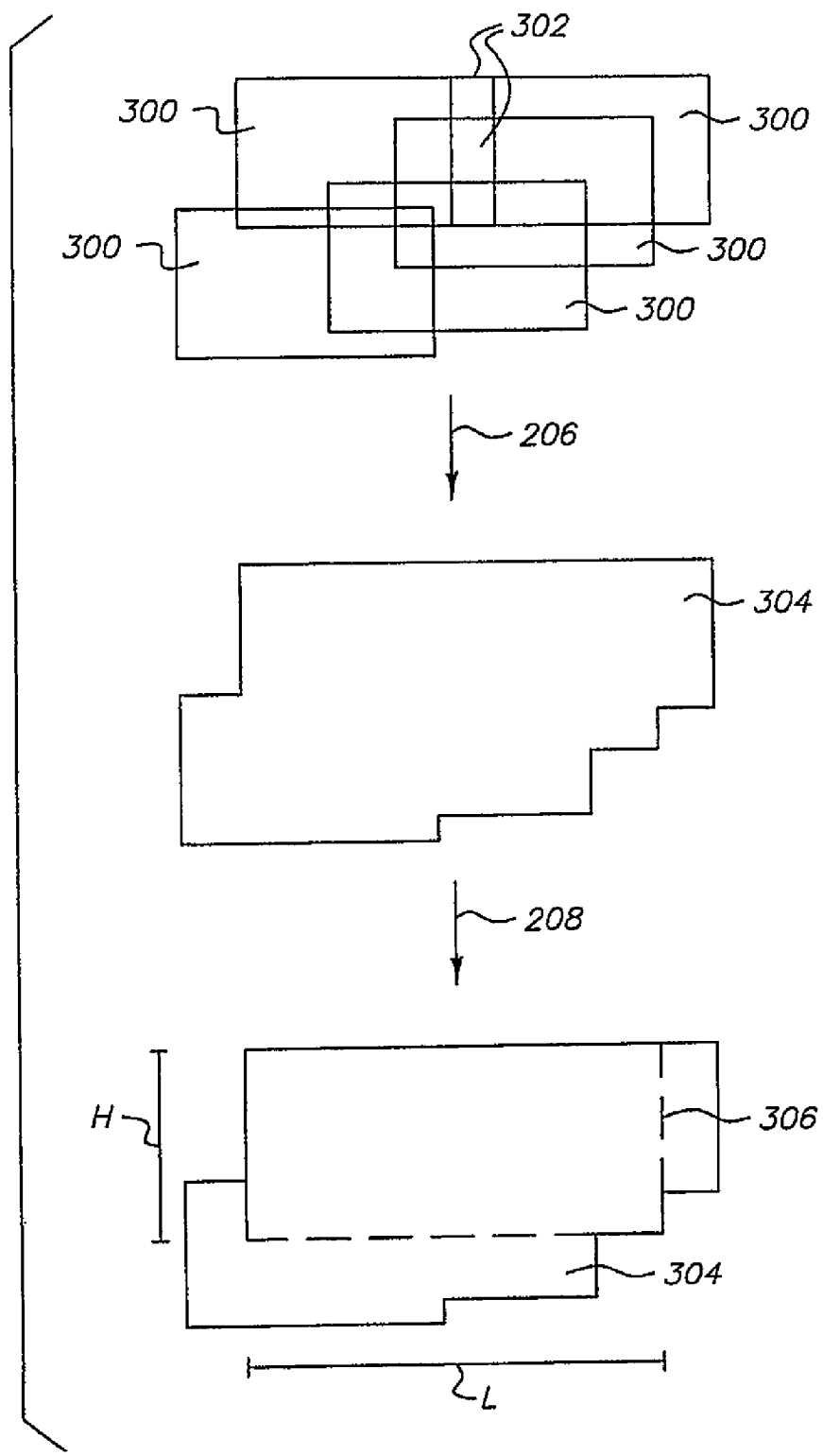
Figure 4:
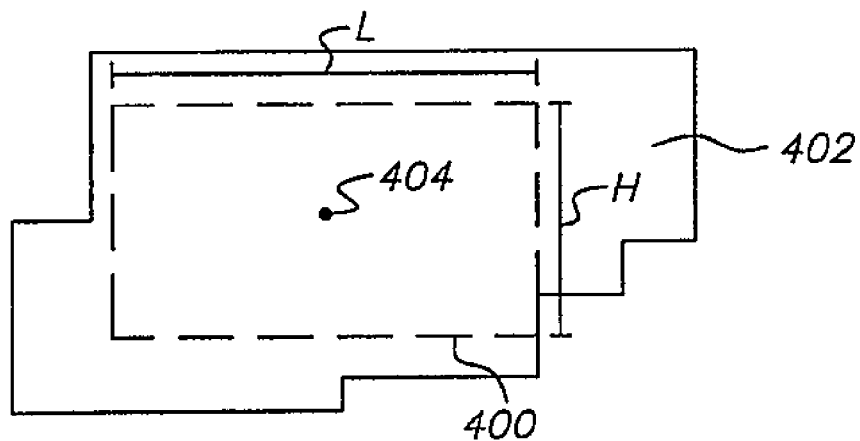
Figure 5:
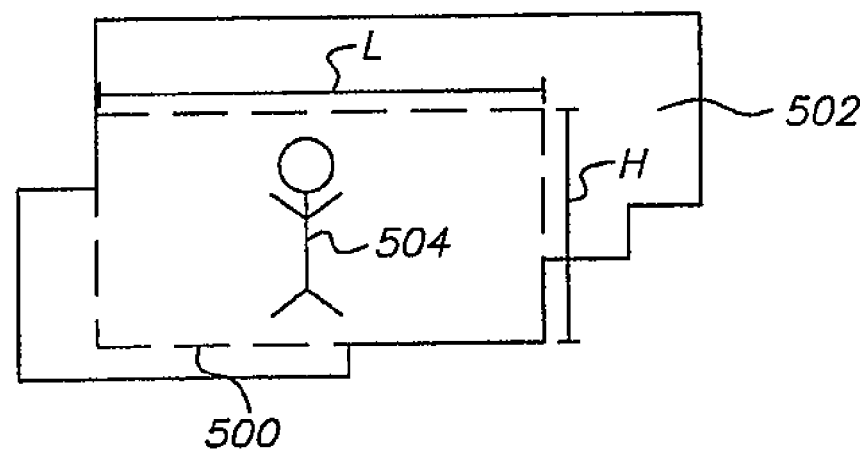
Figure 6:
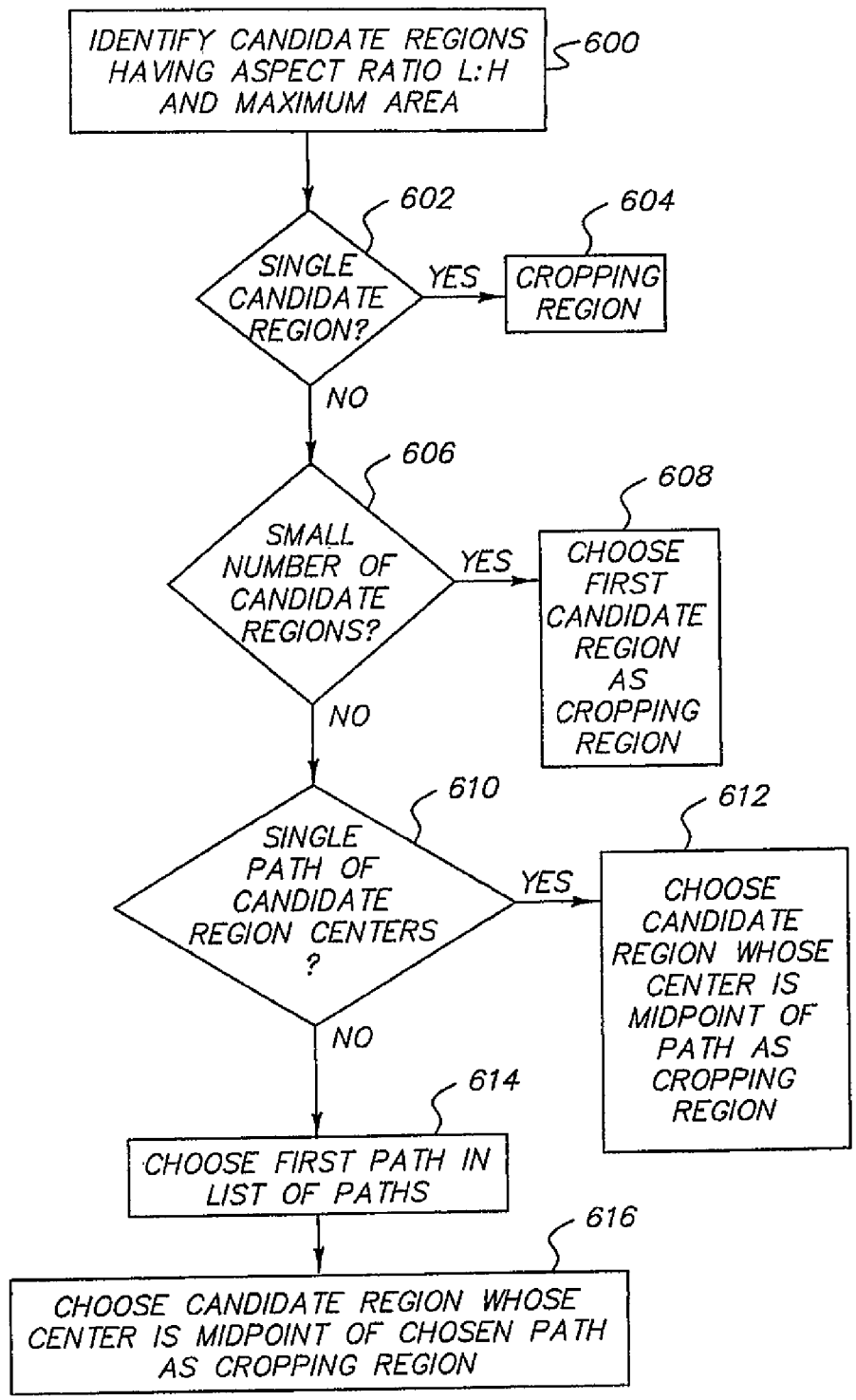
Figure 7:
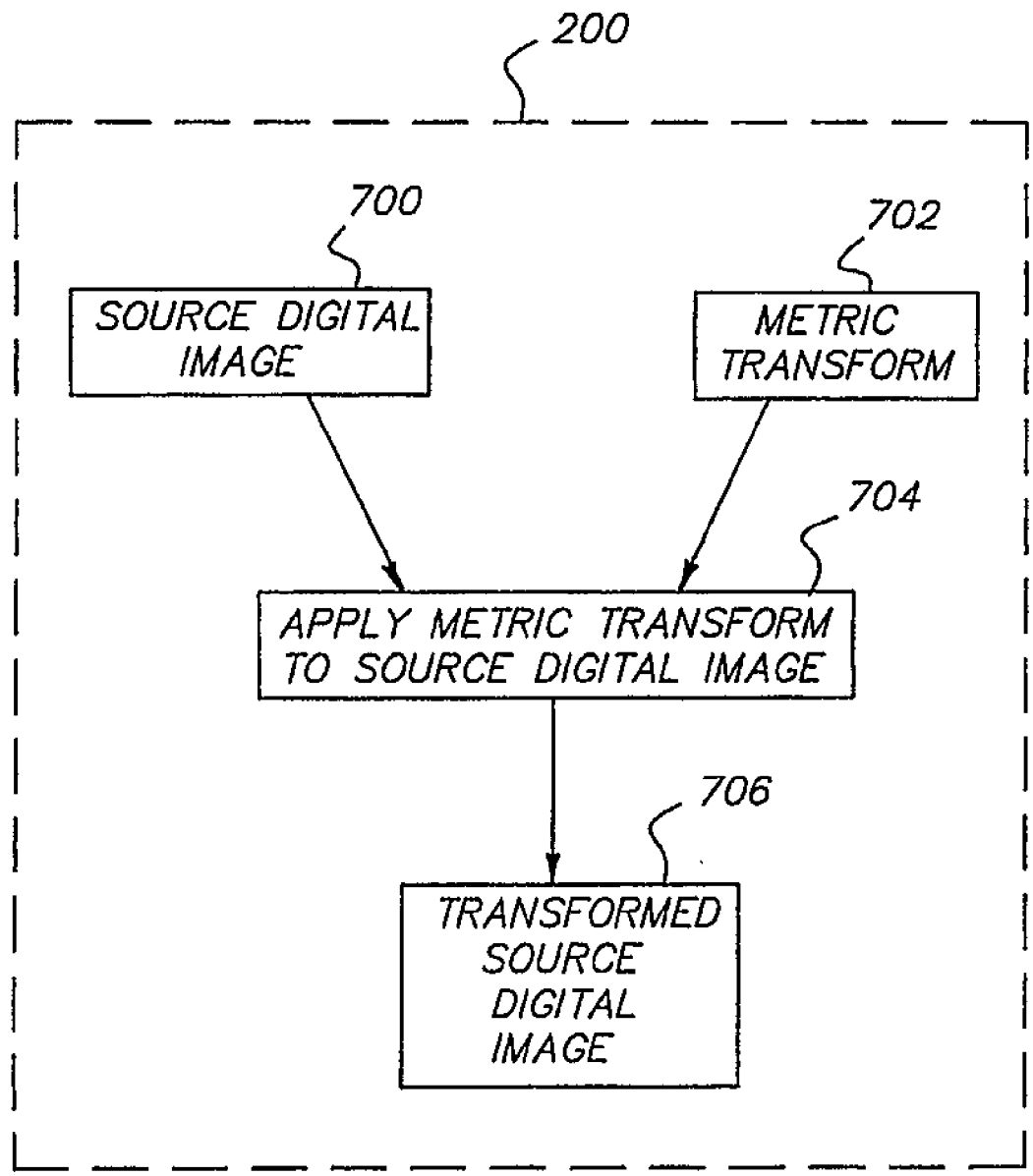
Figure 8A:
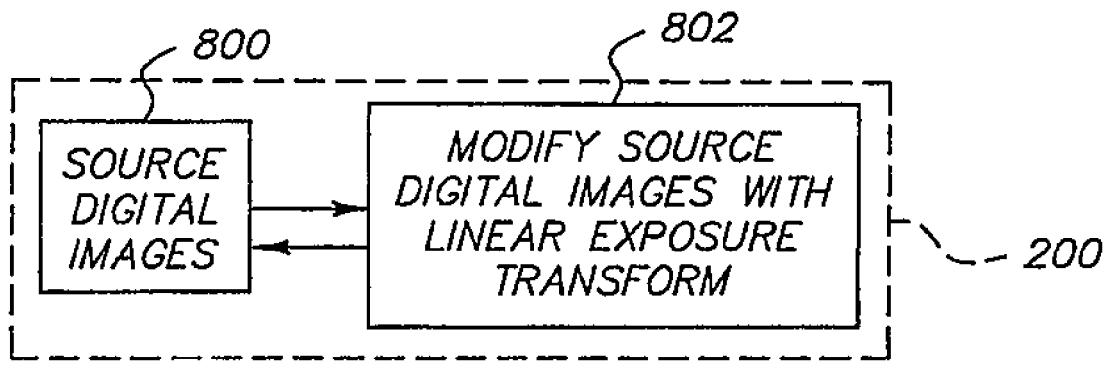
Figure 8B:
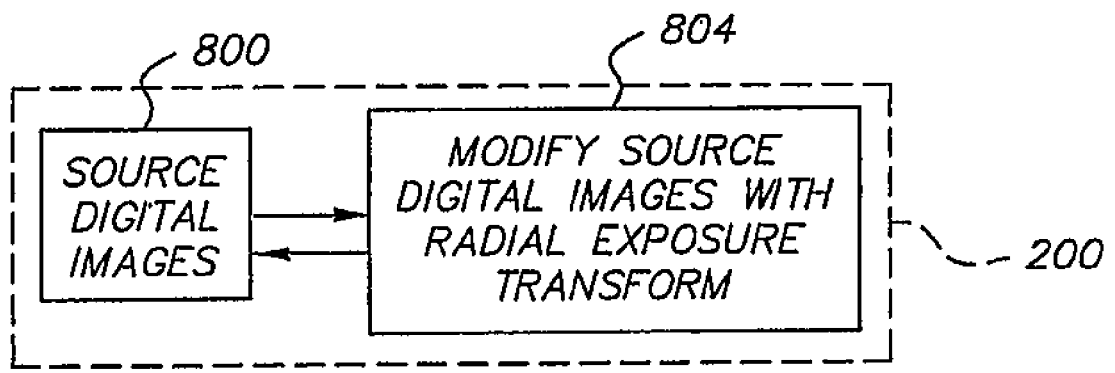
Figure 9:
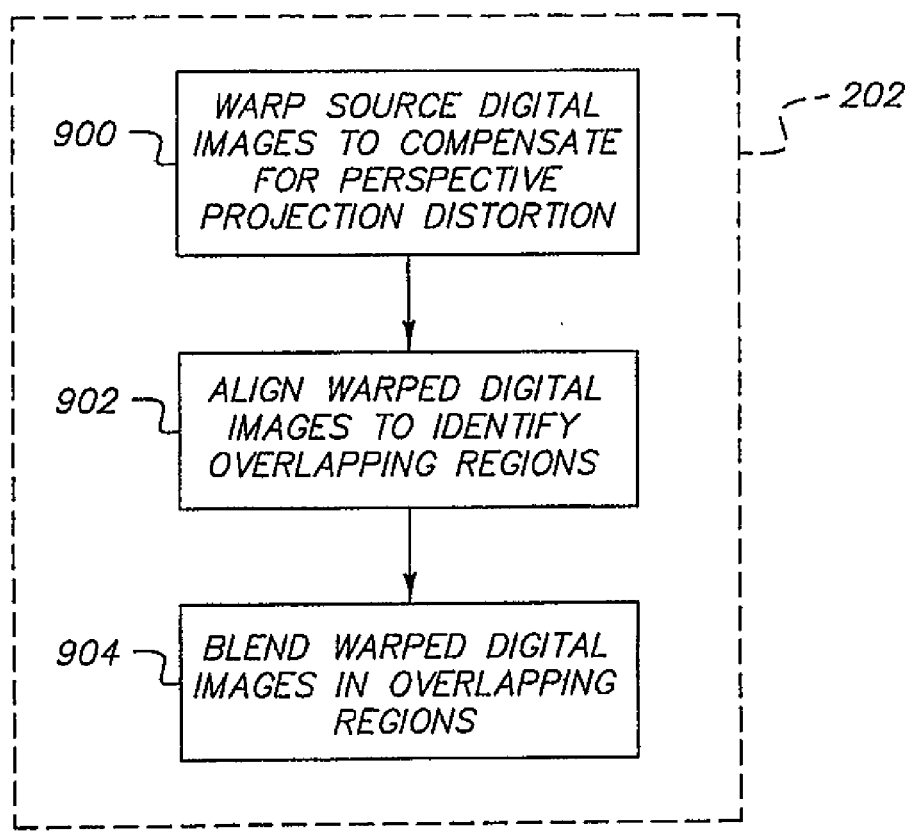
Figure 10:
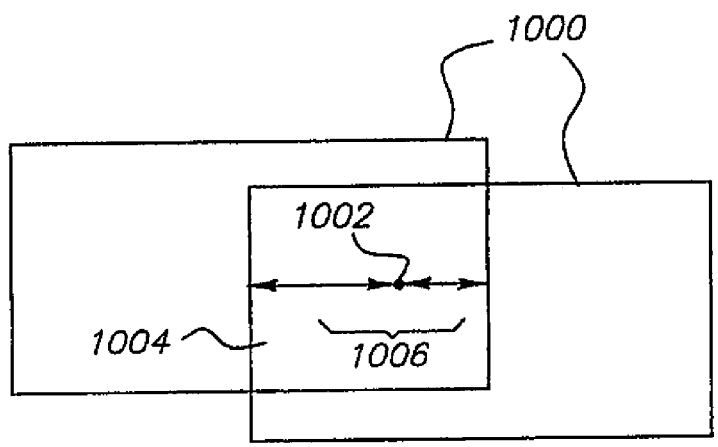
Figure 11:
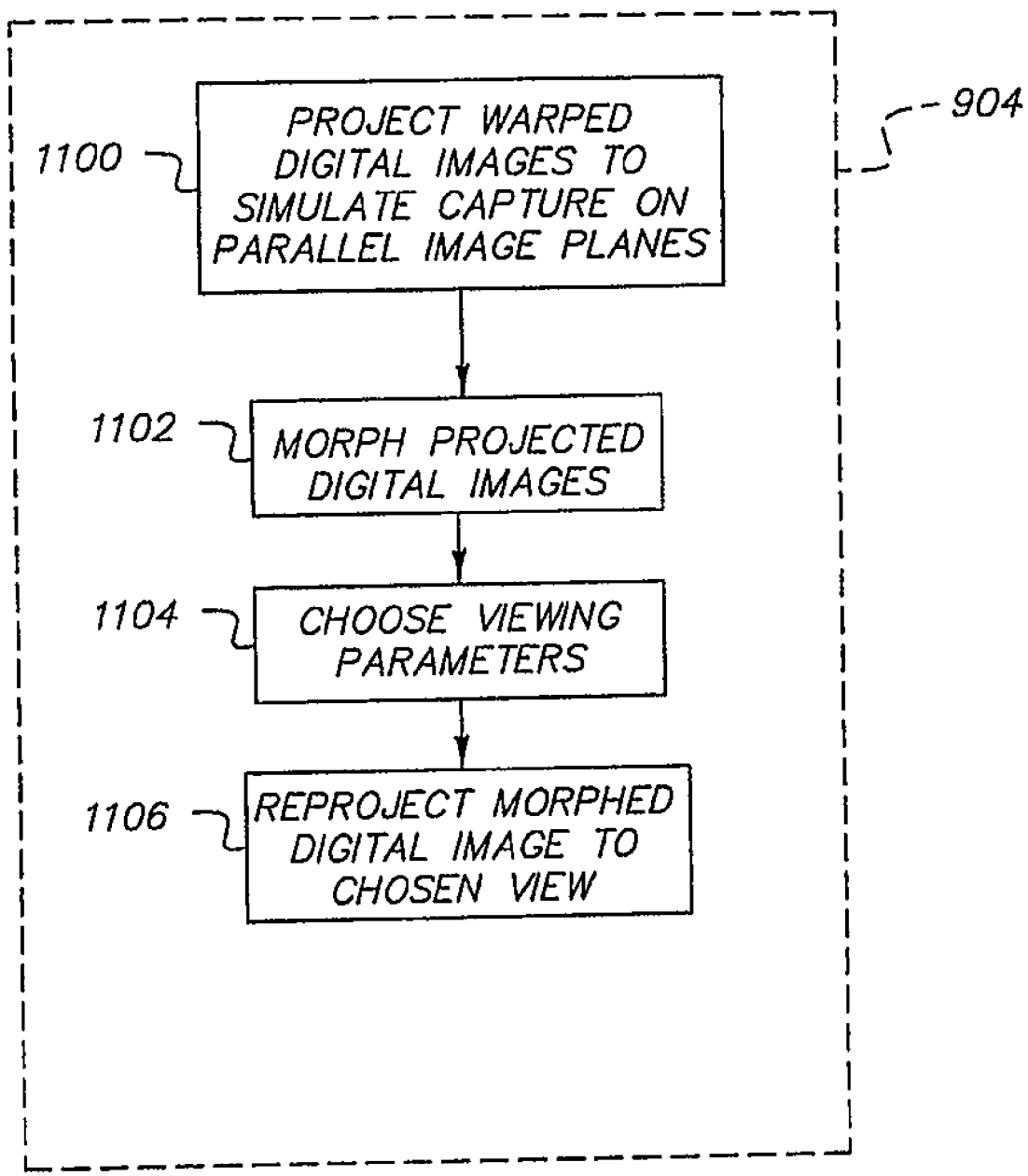
Figure 12A:
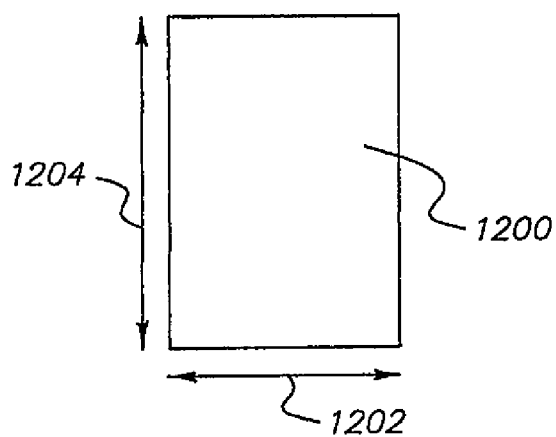
Figure 12B:
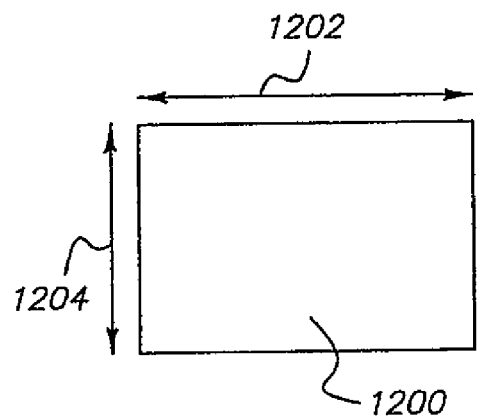
Figure 13A:
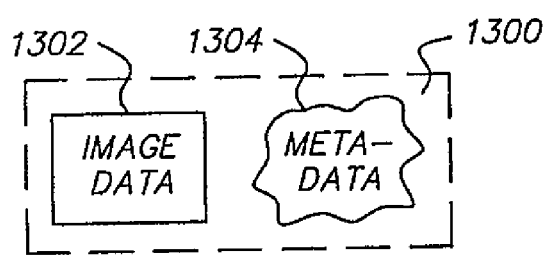
Figure 13B:
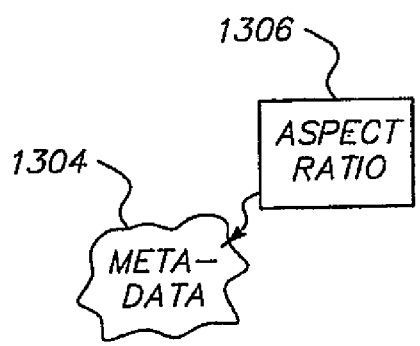

Referring next to FIGS. 13A and 13B, at least one of the source digital image files 1300 may contain meta-data 1304 in addition to the image data 1302. Such meta-data can include the cropping aspect ratio 1306, or any information pertinent to the pedigree of the source digital image.

The invention has been described in detail with particular reference to certain preferred embodiments thereof, but it will be understood that variations and modifications can be effected within the spirit and scope of the invention.

PARTS LIST

| | |
|---|---|
| 10 | digital image processing system |
| 12 | digital image processing computer |
| 14 | network |
| 15 | image capture device |
| 16 | digital image store |
| 18 | high resolution color monitor |
| 20 | hard copy output printer |
| 21 | keyboard and trackball |
| 200 | provide source digital images step |
| 202 | provide cropping aspect ratio step |
| 204 | provide cropping criterion step |
| 206 | combine source digital images step |
| 208 | select cropping region step |
| 210 | crop composite digital image step |
| 212 | cropped digital image |
| 214 | resize cropped digital image step |
| 216 | transform pixel values step |
| 300 | source digital images |
| 302 | overlapping pixel regions |
| 304 | composite digital image |
| 306 | cropping region |
| 400 | cropping region |

-continued

PARTS LIST

| | |
|---|---|
| 402 | composite digital image |
| 404 | centroid of composite digital image |
| 500 | cropping region |
| 502 | composite digital image |
| 504 | main subject of composite digital image |
| 600 | identify candidate regions step |
| 602 | single candidate region query |
| 604 | cropping region chosen |
| 606 | finite number of candidate regions query |
| 608 | cropping region chosen |
| 610 | single path of candidate region centers query |
| 612 | cropping region chosen |
| 614 | choose first path step |
| 616 | cropping region chosen |
| 700 | source digital image |
| 702 | metric transform |
| 704 | apply metric transform step |
| 706 | transformed source digital image |
| 800 | source digital images |
| 802 | modify with linear exposure transform step |
| 804 | modify with radial exposure transform step |
| 900 | warp source digital images step |
| 902 | align warped digital images step |
| 904 | blend warped digital images step |
| 1000 | source digital images |
| 1002 | pixel |
| 1004 | overlapping pixel region |
| 1006 | distances to image edges |
| 1100 | project warped digital images step |
| 1102 | morph projected digital images step |
| 1104 | choose viewing parameters step |
| 1106 | re-project morphed digital image step |
| 1200 | image |
| 1202 | length |
| 1204 | width |
| 1300 | source digital image file |
| 1302 | image data |
| 1304 | meta-data |
| 1306 | aspect ratio |

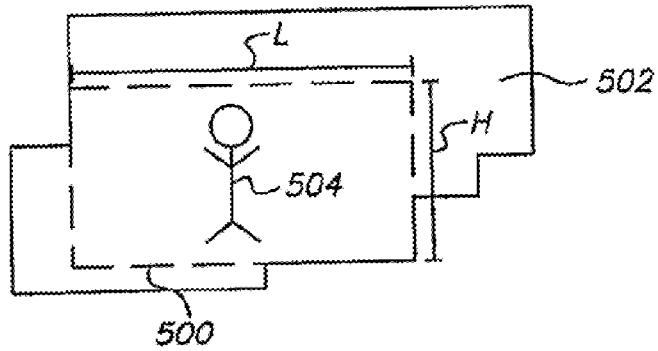

What is claimed is:

1. A method for producing a cropped digital image, comprising the steps of:

providing a plurality of partially overlapping source digital images;

providing a cropping aspect ratio L:H, the cropping aspect ratio being the ratio of the length to the height of the cropped digital image;

providing a cropping criterion, the cropping criterion being a criterion for the size and location of the cropped digital image;

combining the source digital images to form a composite digital image;

automatically selecting the cropping region of the composite digital image according to the cropping criterion, said cropping region being a rectangular region having said aspect ratio L:H, and having size and location determined by the cropping criterion; and, cropping the composite digital image to the cropping region to form a cropped digital image;

wherein the cropping criterion specifies that the cropped digital image is the composite digital image region that is largest in area of one of the sets:

a) the set of all composite digital image regions having said aspect ratio L:H that are centered at the centroid of the composite digital image; and b) the set of all composite digital image regions having said aspect ratio L:H that are centered at the centroid of the main subject of the composite digital image.

2. The method claimed in claim 1, wherein the step of providing source digital images further comprises the step of digitizing source photographic images to form source digital images.

3. The method claimed in claim 1, further comprising the step of:
resizing the cropped digital image for display.

4. The method claimed in claim 1, further comprising the step of:
resizing the cropped digital image for hardcopy output.

5. The method claimed in claim 1, further comprising the step of:
transforming the pixel values of the cropped digital image to an output device compatible color space.

6. The method claimed in claim 1, wherein the step of combining source digital images further comprises the steps of:
i) warping the source digital images to compensate for distortion due to perspective projection, yielding warped digital images;
ii) aligning the warped digital images to identify overlapping regions; and
iii) blending the warped digital images in the overlapping regions to form a composite digital image.

7. The method claimed in claim 6, wherein the step of blending warped digital images includes calculating a weighted average of the pixel values in the overlapping region.

8. The method claimed in claim 6, wherein the step of blending warped digital images further comprises the steps of:
i) projecting the warped digital images to simulate image capture on parallel image planes, forming projected digital images;
ii) morphing the projected digital images in the overlapping regions to form a projected composite digital image;
iii) choosing viewing parameters for a composite digital image; and,
iv) re-projecting the projected composite digital image to simulate image capture with the chosen viewing parameters, forming a composite digital image.

9. The method claimed in claim 1, wherein the step of combining source digital images further comprises warping the composite digital image to simulate projection onto a geometrical surface suitable for viewing.

10. The method claimed in claim 1, wherein the aspect ratio is a portrait aspect ratio and a landscape aspect ratio.

11. The method claimed in claim 1, wherein the aspect ratio is one of: 3:2, 16:9, 3:1, 2:3, 9:16, and 1:3.

12. The method claimed in claim 1, wherein the aspect ratio is included as meta-data with at least one of the source digital images.

13. A computer program product stored on a computer readable medium for performing the method of claim 1.

14. The method of claim 1 wherein the cropping criterion specifies that the cropped digital image is the composite digital image region that is largest in area of the set of all composite digital image regions having said aspect ratio L:H that are centered at the centroid of the composite digital image.

15. The method of claim 1 wherein the cropping criterion specifies that the cropped digital image is the composite digital image region that is largest in area of the set of all composite digital image regions having said aspect ratio L:H that are centered at the centroid of the main subject of the composite digital image.

16. The method of claim 1 wherein the source digital images have pixel values that are linearly or logarithmically related to scene intensity and the step of providing source digital images further comprises applying a metric exposure transform to a source digital image, wherein said exposure transform changes the pixel values of the source digital image such that, following said applying, the pixel values of the source digital image are linearly or logarithmically related to scene intensity.

17. A method for producing a cropped digital image, comprising the steps of:
a) providing a plurality of partially overlapping source digital images;
b) providing a cropping aspect ratio L:H, the cropping aspect ratio being the ratio of the length to the height of the cropped digital image;
c) providing a cropping criterion, the cropping criterion being a criterion for the size and location of the cropped digital image;
d) combining the source digital images to form a composite digital image;
e) automatically selecting the cropping region of the composite digital image according to the cropping criterion, said cropping region being a rectangular region having said aspect ratio L:H, and having size and location determined by the cropping criterion; and,
f) cropping the composite digital image to the cropping region to form a cropped digital image;
wherein the cropping criterion specifies that the cropped digital image is the composite digital image region that is largest in area of the set of all composite digital image regions having said aspect ratio L:H that are centered at the centroid of the composite digital image;
and wherein the source digital images have pixel values that are linearly or logarithmically related to scene intensity and the step of providing source digital images further comprises applying a metric exposure transform to a source digital image such that the pixel values of the source digital image are changed by said transform and are linearly or logarithmically related to scene intensity.

18. A method for producing a cropped digital image, comprising the steps of:
providing a plurality of partially overlapping source digital images;
providing a cropping aspect ratio L:H, the cropping aspect ratio being the ratio of the length to the height of the cropped digital image;
providing a cropping criterion, the cropping criterion being a criterion for the size and location of the cropped digital image;
combining the source digital images to form a composite digital image;
computing a main subject of the composite digital image;
automatically selecting the cropping region of the composite digital image according to the cropping criterion, said cropping region being a rectangular region having said aspect ratio L:H, and having size and location determined by the cropping criterion; and,
cropping the composite digital image to the cropping region to form a cropped digital image;
wherein the cropping criterion specifies that the cropped digital image is the composite digital image region that is largest in area of the set of all composite digital image regions having said aspect ratio L:H that are centered at the centroid of the main subject of the composite digital image.

19. The method claimed in claim 5, wherein the source digital images have pixel values that are linearly or logarithmically related to scene intensity.

20. The method claimed in claim 19, wherein the step of providing source digital images further comprises applying a metric transform to a source digital image such that the pixel values of the source digital image changed by said transform are linearly or logarithmically related to scene intensity.

21. The method claimed in claim 19, wherein the step of providing source digital images further comprises applying linear exposure transform(s) to one or more of the source digital images, wherein said transform(s) produce source digital images having pixel values that closely match in an overlapping region.

22. The method claimed in claim 19, wherein the step of providing source digital images further comprises applying radial exposure transform(s) to one or more of the source digital images to compensate for exposure falloff.

23. The method of claim 18 wherein said computing is automatic using a reasoning engine.

24. A system for producing a cropped digital image, comprising:
- a plurality of partially overlapping source digital images;
- means for specifying a cropping aspect ratio L:H, the cropping aspect ratio being the ratio of the length to the height of the cropped digital image;
- means for specifying a cropping criterion, the cropping criterion being a criterion for the size and location of the cropped digital image;
- means for combining the source digital images to form a composite digital image;
- means for automatically computing a main subject of the composite digital image using a reasoning engine;
- means for automatically selecting the cropping region of the composite digital image according to the cropping criterion, said cropping region being a rectangular region having said aspect ratio L:H, and having size and location determined by the cropping criterion; and,
- means for cropping the composite digital image to the cropping region to form a cropped digital image
wherein the cropping criterion specifies that the cropped digital image is the composite digital image region that is largest in area of:
- the set of all composite digital image regions having said aspect ratio L:H that are centered at the centroid of the main subject of the composite digital image.

25. A method for producing a cropped digital image, comprising the steps of:
- providing a plurality of partially overlapping source digital images;
- providing a cropping aspect ratio;
- providing a cropping criterion, said cropping criterion being a criterion for a size and location of the cropped digital image;
- combining said source digital images to form a composite digital image;
- automatically selecting a cropping region of said composite digital image according to said cropping criterion, said cropping region being a rectangular region having said aspect ratio, and said size and said location determined by said cropping criterion; and,
- cropping said composite digital image to said cropping region;
wherein the cropping criterion specifies that the cropped digital image is the composite digital image region that is largest in area of one of the sets:
  a) the set of all composite digital image regions having said aspect ratio L:H that are centered at the centroid of the composite digital image; and
  b) the set of all composite digital image regions having said aspect ratio L:H that are centered at the centroid of the main subject of the composite digital image
and wherein the source digital images have pixel values that are linearly or logarithmically related to scene intensity and the step of providing source digital images further comprises applying a metric exposure transform to a source digital image such that the pixel values of the source digital image are changed by said transform and are linearly or logarithmically related to scene intensity.

* * * * *

UNITED STATES PATENT AND TRADEMARK OFFICE
CERTIFICATE OF CORRECTION

| | | |
|---|---|---|
| PATENT NO. | : 7,162,102 B2 | |
| APPLICATION NO. | : 10/025357 | |
| DATED | : January 9, 2007 | |
| INVENTOR(S) | : Cahill et al. | |

It is certified that error appears in the above-identified patent and that said Letters Patent is hereby corrected as shown below:

Delete Title page illustrating a figure(s), and substitute therefor, new Title page illustrating a figure(s). (attached)

Delete drawing sheet 1-10, and substitute therefor drawing sheet 1-10. (attached)

| | |
|---|---|
| Claim 10, Column 21, Line 48 | In Claim 10, after "ratio is" insert -- one of --. |
| Claim 19, Column 23, Line 1 | In Claim 19, delete "5," and insert -- 18, --, therefor. |
| Claim 25, Column 24, Lines 33-39 | In Claim 25, after "digital image" delete "and wherein the source digital images have pixel values that are linearly or logarithmically related to scene intensity and the step of providing source digital images further comprises applying a metric exposure transform to a source digital image such that the pixel values of the source digital image are changed by said transform and are linearly or logarithmically related to scene intensity". |

Signed and Sealed this

Fourth Day of September, 2007

JON W. DUDAS
*Director of the United States Patent and Trademark Office*

(12) United States Patent
Cahill et al.

(10) Patent No.: US 7,162,102 B2
(45) Date of Patent: Jan. 9, 2007

(54) METHOD AND SYSTEM FOR COMPOSITING IMAGES TO PRODUCE A CROPPED IMAGE

(75) Inventors: Nathan D. Cahill, West Henrietta, NY (US); Lawrence A. Ray, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 610 days.

(21) Appl. No.: 10/025,357

(22) Filed: Dec. 19, 2001

(65) Prior Publication Data
US 2003/0113035 A1  Jun. 19, 2003

(51) Int. Cl.
G06K 9/36 (2006.01)
(52) U.S. Cl. .................................. 382/288; 382/284
(58) Field of Classification Search ............. 382/284, 382/153, 294, 167, 159, 288; 348/441–459, 348/556; 396/436
See application file for complete search history.

(56) References Cited

U.S. PATENT DOCUMENTS

| | | | |
|---|---|---|---|
| 4,150,360 A * | 4/1979 | Kopp et al. | 382/133 |
| 4,812,903 A * | 3/1989 | Wagensonner et al. | 358/521 |
| 5,138,460 A | 8/1992 | Egawa | |
| 5,649,032 A * | 7/1997 | Burt et al. | 382/284 |
| 6,094,218 A * | 7/2000 | Suzuki et al. | 348/96 |
| 6,097,854 A | 8/2000 | Szeliski et al. | |
| 6,243,103 B1 | 6/2001 | Takiguchi et al. | |
| 6,266,128 B1 * | 7/2001 | Yoshida et al. | 355/40 |
| 6,282,317 B1 | 8/2001 | Luo et al. | |
| 6,549,681 B1 * | 4/2003 | Takahashi et al. | 382/294 |
| 6,580,457 B1 * | 6/2003 | Armstrong et al. | 348/317 |
| 6,744,931 B1 * | 6/2004 | Komiya et al. | 382/284 |
| 2003/0040971 A1 * | 2/2003 | Freedenberg et al. | 705/26 |
| 2004/0071367 A1 * | 4/2004 | Irani et al. | 382/284 |

OTHER PUBLICATIONS

Seitz et al., View Morphing, 1996, ACM Press, Proceedings of the 23rd annual conference on Computer graphics and interactive techniques, pp. 21-30.*
Seitz et al., View Morphing, SIGGRAPH '96, *Computer Graphics*, pp. 21-30.
Kuglin et al., The Phase Correlation Image Alignment Method, *Proc. '75 International Conference on Cybernetics and Society*, 1975, pp. 163-165.
Textbook: Gonzalez, et al., Digital Image Processing, Addison-Wesley, 1992.
Zhang et al., A Robust Technique for Matching Two Uncalibrated Images Through the Recovery of the Unknown Epipolar Geometry, INRIA Report No. 2273, May 1994, pp. 1-38.
Textbook: A. K. Jain, Fundamentals of Digital Image Processing, Prentice Hall, 1989, Chapter 4, pp. 80-131.

(Continued)

*Primary Examiner*—Daniel Miriam
*Assistant Examiner*—Dennis Rosario
(74) *Attorney, Agent, or Firm*—Thomas H. Close

(57) ABSTRACT

A method for producing a cropped digital image, includes the steps of: providing a plurality of partially overlapping source digital images; providing a cropping aspect ratio L:H, the cropping aspect ratio being the ratio of the length to the height of the cropped digital image; providing a cropping criterion, the cropping criterion being a criterion for the size and location of the cropped digital image; combining the source digital images to form a composite digital image; selecting the cropping region of the composite digital image according to the cropping criterion, said cropping region being a rectangular region having aspect ratio L:H, and having size and location determined by the cropping criterion; and, cropping the composite digital image to the cropping region to form a cropped digital image.

25 Claims, 10 Drawing Sheets